US007002082B2

(12) United States Patent
Kageyama et al.

(10) Patent No.: US 7,002,082 B2
(45) Date of Patent: Feb. 21, 2006

(54) COMBINATIONAL WEIGHING DEVICE

(75) Inventors: Toshiharu Kageyama, Shiga (JP);
Takumi Kawamura, Shiga (JP)

(73) Assignee: Ishida Co. Ltd., Kyoto (JP)

( * ) Notice: Subject to any disclaimer, the term of this patent is extended or adjusted under 35 U.S.C. 154(b) by 166 days.

(21) Appl. No.: 10/704,914

(22) Filed: Nov. 12, 2003

(65) Prior Publication Data

US 2004/0094335 A1 May 20, 2004

(30) Foreign Application Priority Data

Nov. 14, 2002 (JP) ............................ P2002-330384
Dec. 18, 2002 (JP) ............................ P2002-366485

(51) Int. Cl.
*G01G 19/387* (2006.01)
(52) U.S. Cl. .................................. 177/25.18; 177/121
(58) Field of Classification Search ............. 177/25.18, 177/103, 104, 121
See application file for complete search history.

(56) References Cited

U.S. PATENT DOCUMENTS

| 4,615,403 | A | * | 10/1986 | Nakamura | ............... 177/25.18 |
| 4,708,215 | A | * | 11/1987 | Nakamura et al. | ........ 177/25.18 |
| 5,270,495 | A | * | 12/1993 | Mosher et al. | ............ 177/25.18 |
| 5,767,455 | A | * | 6/1998 | Mosher | ........................ 177/64 |
| 6,376,784 | B1 | * | 4/2002 | Morinaka | .................... 177/121 |
| 6,545,230 | B1 | * | 4/2003 | Tamai et al. | .............. 177/25.18 |
| 2004/0104054 | A1 | * | 6/2004 | Kageyama et al. | |

FOREIGN PATENT DOCUMENTS

| JP | 05-180687 | * | 7/1993 | ............... 177/25.18 |
| JP | 05-256682 | * | 10/1993 | ............... 177/25.18 |

* cited by examiner

*Primary Examiner*—Randy W. Gibson
(74) *Attorney, Agent, or Firm*—Staas & Halsey LLP

(57) ABSTRACT

A combinational weighing device is provided with a detection part detecting a measuring state on the basis of the quantity of a object introduced into each measuring hopper and a correction part operating a target dispersed weight defining the reference for control on a cross feeder by a supply control part. The correction part corrects the target dispersed weight in response to the measuring state of the combinational weighing device detected by the detection part. In other words, the correction part controls the quantity of the object supplied to a dispersion feeder on the basis of measured data indicating an actually measured value. Thus provided is a combinational weighing device performing efficient measurement without complicating the device structure.

15 Claims, 15 Drawing Sheets

FIG. 8

|  | FIRST TIME | SECOND TIME | THIRD TIME | ... | n-TH TIME |
|---|---|---|---|---|---|
| MAJOR SHORTAGE | Kr1 | Kr2 | Kr3 | ... | Krn |
| MINOR SHORTAGE | Ks1 | Ks2 | Ks3 | ... | Ksn |
| NORMAL | Kt1 | Kt2 | Kt3 | ... | Ktn |
| OVERSUPPLY | Ku1 | Ku2 | Ku3 | ... | Kun |

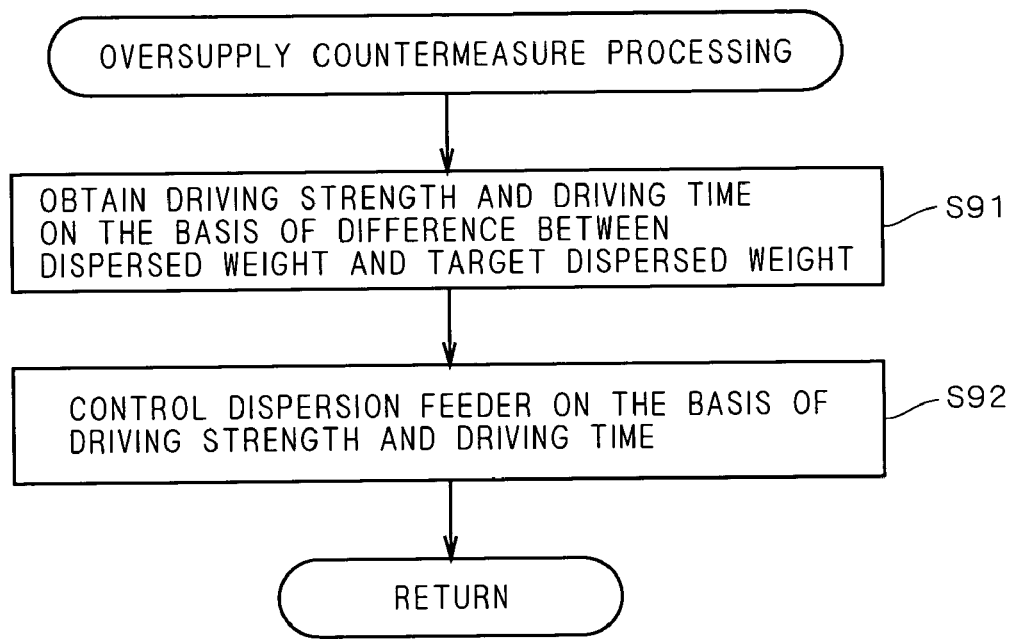

COMBINATIONAL WEIGHING DEVICE

BACKGROUND OF THE INVENTION

1. Field of the Invention

The present invention relates to a combinational weighing device combining groups of objects having different weights with each other to reach a desired weight. More specifically, it relates to a technique of controlling the quantity of each group of objects in a combinational weighing device.

2. Description of the Background Art

A combinational weighing device is employed in order to bag objects such as sweets or vegetables having different weights by a desired total weight (target measured value). The combinational weighing device temporarily disperses objects to a plurality of groups, weighs each group of objects and selects a combination of values of each group for implementing the target measured value.

Briefly stated, a cross feeder of a general combinational weighing device supplies objects introduced into the device to a dispersion feeder. The combinational weighing device dispersively discharges the objects supplied to the dispersion feeder to a plurality of radiation feeders and thereafter transports the same to each measuring hopper through a pool hopper. Each measuring hopper measures the weight (hereinafter referred to as "transport quantity") of the groups of objects transported from the corresponding radiation feeder and outputs the result of the measurement to a control part consisting of a CPU or the like. The control part selects the optimum combination of measuring hoppers on the basis of the result of the measurement and instructs the selected measuring hoppers to introduce the group of objects. The measuring hoppers instructed by the control part open on-off gates for introducing the group of objects into a collecting chute. The combinational weighing device bags a plurality of groups of objects introduced into the collecting chute through a discharge chute. In such a combinational weighing device, the probability of presence of combinations of the measuring hoppers attaining a target measured value depends on the transport quantity of each group of objects introduced into the respective measuring hoppers. In this combinational weighing device, therefore, it is important to properly control the transport quantity in order to perform efficient combinational measurement processing.

As exemplary means for controlling the transport quantity in such a combinational weighing device, there is proposed a device for controlling the supply ability of a dispersion feeder according to a prescribed operation technique on the basis of a result of measurement received from a measuring hopper (a result of measurement of the transport quantity) thereby properly controlling the aforementioned transport quantity.

There is also proposed a device setting a target introduction number (n/2, where n represents the number of measuring hoppers provided in the device) of the measuring hoppers for attaining a proper transport quantity, comparing the number of measuring hoppers performing introduction in practice and the target introduction number with each other, regarding that the transport quantity is reduced if the number of the measuring hoppers performing introduction is greater than the target introduction number and increasing driving strength (exciting force) for a dispersion feeder.

The general combinational weighing device consumes objects substantially identical in quantity to the target measured value in one cycle by bagging due to the aforementioned processing. If the quantity (hereinafter referred to as "delivery") of the objects discharged from the dispersion feeder to the radiation feeders during this cycle is equal to the target measured value, therefore, no oversupply/undersupply takes place in the radiation feeders or the like but the combinational weighing device most efficiently stably operates.

As a device structured on the basis of this principle, there is proposed a device driving a dispersion feeder by one cycle on the basis of a manipulated variable and obtaining the delivery currently discharged from the dispersion feeder for obtaining the manipulated variable of the dispersion feeder in a subsequent cycle so that the value reaches a target measured value.

Also when the device properly obtains and controls the manipulated variable of the dispersion feeder in the aforementioned manner, however, the delivery discharged from the dispersion feeder varies with the distributed state etc. of the objects present on the dispersion feeder. Therefore, the delivery does not reach the target measured value in practice unless the device properly controls the quantity of the objects supplied to the dispersion feeder.

In order to solve this problem, there is generally proposed a device implementing thickness (distributed state) control of objects on a dispersion feeder. For example, there is proposed a device supplying objects from a cross feeder on-off controlled on the basis of a prescribed value to a dispersion feeder through a scattering prevention cylinder. This device obtains the rate of change of a dispersed weight from the quantity (hereinafter referred to as "dispersed weight") of the objects present on the dispersion feeder and controls the position of the scattering prevention cylinder on the basis of a result of comparison of the rate of weight change and a prescribed value thereby controlling the thickness (dispersed state) of the objects present on the dispersion feeder.

However, this device controlling the thickness of the objects on the dispersion feeder by vertically moving the scattering prevention cylinder must be provided with a driving mechanism or a position sensor capable of precisely controlling the scattering prevention cylinder, disadvantageously leading to complicatedness of the device structure.

Further, the aforementioned conventional device performs control not on the basis of the transport quantity to be controlled but on the basis of a previously set value. Therefore, control accuracy is disadvantageously reduced due to influence by working environment for the device or the like to reduce measurement efficiency.

Further, the device must be separately provided with a mechanism or the like correctly driving the scattering prevention cylinder, disadvantageously leading to complicatedness of the device structure.

SUMMARY OF THE INVENTION

The present invention is directed to a combinational weighing device for weighing respective groups of objects to determine a partial combination of the groups of objects having a total weight approximating to a target combination weight.

According to the present invention, the combinational weighing device comprises: a first transport element transporting objects supplied; a dispersion element dispersing the objects transported by the first transport element; a supply control element controlling the first transport element on the basis of a target dispersed weight which is a target of total weight of the objects present on the dispersion element; a plurality of second transport elements transporting respective groups of objects dispersed by the dispersion element;

a transported weight measuring element measuring respective weights of the groups of objects transported by the plurality of second transport elements; a detection element detecting an empty state of any second transport element and a measuring state of the combinational weighing device on the basis of the respective weights of the groups of objects measured by the transported weight measuring element; and a correction element determining a supply state of the objects onto the dispersion element on the basis of the result of detection of the detection element to correct the target dispersed weight.

Thus, it is possible to correct the target dispersed weight on the basis of the measuring state based on the actually measured value, thereby improving control accuracy. Therefore, the combinational measuring device can perform efficient measurement. Further, the combinational measuring device may not be separately provided with a driving mechanism or the like, and the device structure is not complicated.

The correction element determines the supply state in one of a plurality of stages, and corrects the target dispersed weight by a correction quantity depending on the stage determined. Thus, the correction element enables correction further responsive to the situation, whereby measurement efficiency can be improved.

The correction quantity for each stage is determined in response to a continuous occurrence frequency of the each stage. Thus, it is possible to prevent overcontrol while ensuring responsibility.

The detection element obtains an incidence of an oversupply state in the combinational weighing device on the basis of the measuring state in the combinational weighing device so that the correction element corrects the target dispersed weight when the incidence is in excess of a prescribed value. Thus, the combinational measuring device can quickly take countermeasures against a multiple oversupply state.

The correction element sets a frequency for continuously correcting the target dispersed weight to not more than a prescribed frequency when the incidence continuously exceeds the prescribed value. Thus, it is possible to prevent overcontrol while ensuring responsibility.

The combinational weighing device further comprises a dispersed weight measuring element measuring the total weight of the objects present on the dispersion element and a delivery control element controlling a driving duration for the dispersion element in response to the total weight of the objects measured by the dispersed weight measuring element. Thus, it is possible to properly control the quantity of the objects discharged from the dispersion element.

The present invention is also directed to a combinational weighing device for measuring respective groups of objects to determine a partial combination of the groups of objects having a total weight approximating to a target combination weight.

According to the invention, the combinational weighing device comprises: a transport element transporting objects supplied; a dispersion element dispersing the objects transported by the transport element; a dispersed weight measuring element measuring the total weight of the objects present on the dispersion element; a detection element detecting the delivery weight of the objects discharged by the dispersion element; a thickness control element controlling the supply of the objects from the transport element to the dispersion element on the basis of a target dispersed weight which is a target of total weight of the objects present on the dispersion element; and a change element changing the target dispersed weight.

Thus, it is possible to control the quantity of the objects supplied to the dispersion element in response to the working environment without complicating the device structure, thereby properly controlling the thickness of the objects present on the dispersion element. Therefore, the combinational weighing device can efficiently weigh and combine the groups of objects.

The change element changes the target dispersed weight so that the delivery of the objects reaches a prescribed weight on the basis of the delivery weight of the objects detected by the detection element. Thus, it is possible to suppress oversupply/undersupply of the objects, thereby stabilizing operations of the combinational weighing device.

The change element changes the target dispersed weight by a quantity depending on a measuring state of the objects in the combinational weighing device. Thus, it is possible to readily control the supply of the objects to the dispersion element.

The combinational weighing device further comprises a determination element determining suitability of change of the target dispersed weight by the change element, and the determination element determines the suitability in response to a measuring state of the objects in the combinational weighing device. Thus, it is possible to prevent useless change of the target dispersed weight thereby improving control efficiency.

The combinational weighing device further comprises a delivery control element controlling the delivery of the objects discharge by the dispersion element. Thus, it is possible to readily control the delivery of the objects discharged by the dispersion element.

The combinational weighing device further comprises an element disenabling the combinational weighing device when the total weight of the objects measured by the dispersed weight measuring element is not more than a predetermined lower limit. Thus, it is possible to remove an unnecessary operation when causing undersupply, thereby improving the working efficiency.

Accordingly, an object of the present invention is to provide a combinational measuring device capable of efficiently weighing and combining objects without complicating the device structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 illustrates a correction factor every stage classified in response to a measuring state of the combinational weighing device;

FIG. 15 is a flow chart showing oversupply countermeasure processing in the combinational weighing device according to the third embodiment in detail.

DESCRIPTION OF THE PREFERRED EMBODIMENTS

Figure 1:
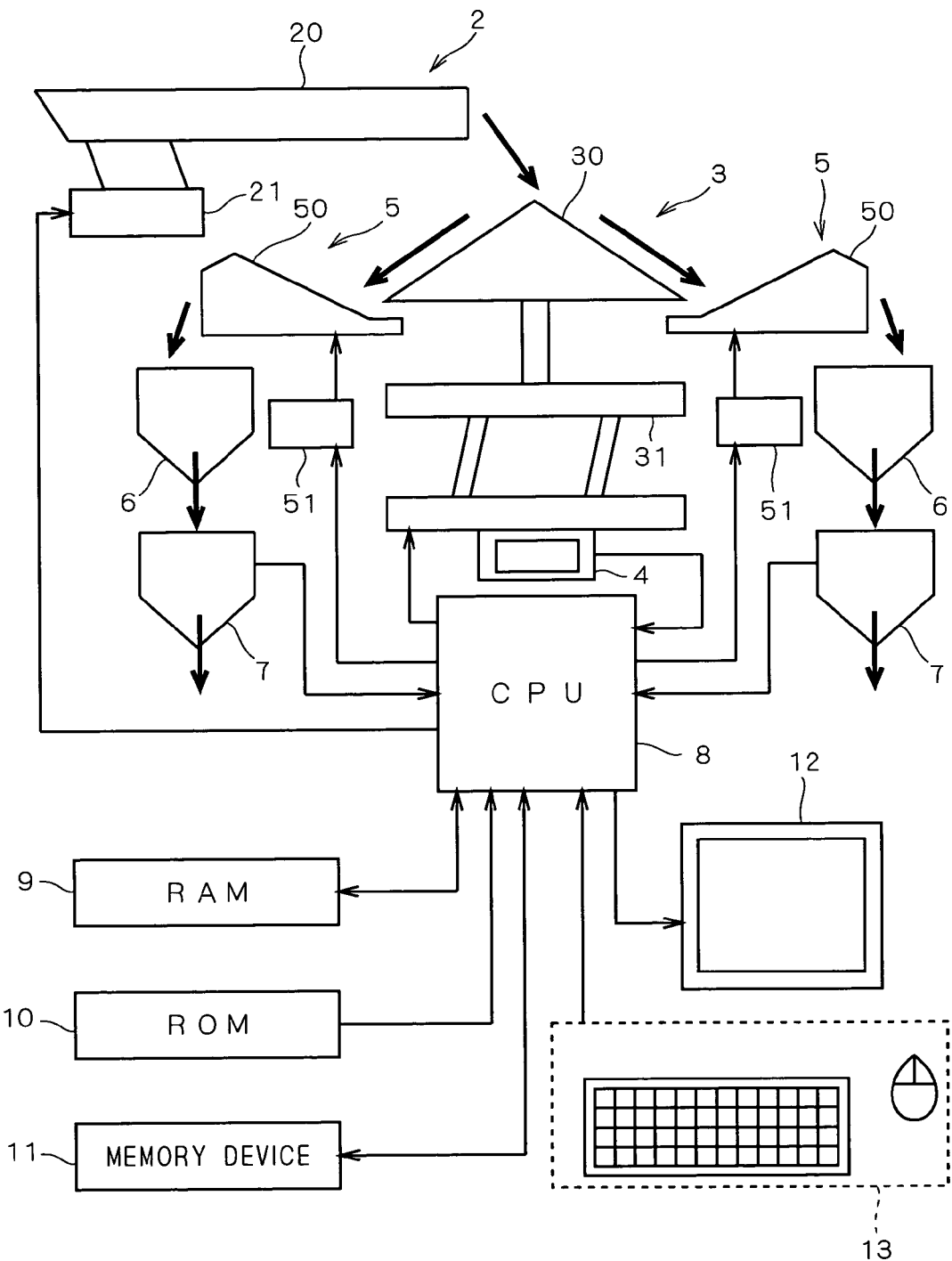
FIG. 1 is a conceptual diagram showing the structure of a combinational weighing device according to a first preferred embodiment of the present invention and the connectional relation between respective components of the structure.

FIG. 1 is a conceptual diagram showing the structure of a combinational weighing device 1 according to a first preferred embodiment of the present invention and the connectional relation between respective elements of the structure. The combinational weighing device 1 comprises a cross feeder 2, a dispersion feeder 3, a measurer 4, a plurality of radiation feeders (radiation troughs) 5, pool hoppers 6 and measuring hoppers 7. The combinational weighing device 1 also comprises a CPU 8, a RAM 9, a ROM 10 and a memory device 11 as components for mainly controlling the respective components 2 to 7.

The combinational weighing device 1 further comprises a display part 12 screen-displaying various data as an interface with an operator and an operation part 13 for inputting instructions from the operator. The operation part 13, constituted of a keyboard, a mouse etc. may alternatively be formed by a touch panel display or the like also serving as the display part 12. The combinational weighing device 1 is further provided with a collecting chute (not shown) receiving groups of objects discharged from the measuring hoppers 7 in a combinational manner and a discharge chute (not shown).

The combinational weighing device 1 according to the first preferred embodiment is constituted of the aforementioned components 2 to 13 as a device for combining each group of objects such as sweets or fruits having different weights with each other to reach a prescribed total weight (hereinafter referred to as "target measured value Tg") and bagging the same. This combinational weighing device 1 is also applicable to a boxer or a bottler employed for a similar object, as a matter of course.

The cross feeder 2 is constituted of a trough 20 receiving the objects thereon and a driving mechanism 21 driving the trough 20. In this cross feeder 2, the driving mechanism 21 drives the trough 20 in the prescribed direction thereby transporting the objects supplied to the combinational weighing device 1 (placed on the trough 20) to the dispersion feeder 3. The driving mechanism 21 is driven on the basis of an on-off control signal (thickness control data 106 in FIG. 9) from the CPU 8.

The dispersion feeder 3 is constituted of a dispersion table 30 supplied with the objects from the cross feeder 2 and a base 31 holding the dispersion table 30.

The dispersion table 30 has a substantially conical upper surface, and is supplied with the objects transported by the cross feeder 2 around the apex of the upper surface as shown by arrow in FIG. 1. The base 31 vibrates/drives the dispersion table 30 while holding the same on a prescribed position. The base 31 thus vibrates/drives the dispersion table 30 for radially moving the objects transported to the dispersion table 30 while dispersing the same in the peripheral direction of the upper surface of the dispersion table 30 as shown by arrows in FIG. 1 and discharging the same to each radiation feeder 5. The base 31 can change vibration strength (driving strength) for the dispersion table 30 on the basis of a control signal (strength control data 108 in FIG. 9, for example) from the CPU 8.

The measurer 4 having the function of a general scale for measuring weights measures the weight (hereinafter referred to as "dispersed weight") of the objects present on the dispersion table 30 at prescribed timing and outputs the result of the measurement (dispersed weight data 103 in FIG. 2) to the CPU 8.

In the combinational weighing device 1, the plurality of radiation feeders 5 are arranged along the periphery of a circular edge of the dispersion table 30. The dispersion feeder 3 dispersively radially moves the objects as hereinabove described, thereby dispersively discharging the objects to the respective radiation feeders 5.

Each radiation feeder 5 comprises a feeder part 50 receiving and transporting the corresponding objects and a driving mechanism 51. In each radiation feeder 5, the driving mechanism 51 vibrates/drives the feeder part 50 thereby transporting the objects received by the feeder part 50 in a prescribed direction and introducing the same into a prescribed one of the pool hoppers 6. The driving mechanism 51 can change vibration strength for the feeder 50 on the basis of a control signal from the CPU 8. In other words, the combinational weighing device 1 can control the transport quantity of each radiation feeder 5 by adjusting this vibration strength.

Each pool hopper 6 temporarily holds a group of the objects received from the corresponding radiation feeder 5. The pool hopper 6 further opens an on-off gate (not shown) at prescribed timing thereby introducing the held group of the objects into the corresponding measuring hopper 7.

Each measuring hopper 7 holds the group of the objects received from the corresponding pool hopper 6, measures the weight of the group and outputs the result of the measurement (measured data 100 in FIG. 2) to the CPU 8. The measuring hopper 7 further opens an on-off gate (not shown) on the basis of a control signal from the CPU 8 thereby introducing the held group of the objects into the collecting chute. The combinational weighing device 1 comprises the pool hoppers 6 and the measuring hoppers 7 in one-to-one correspondence to the radiation feeders 5 respectively.

Thus, the CPU 8 can determine which radiation feeder 5 has transported the group of the objects held by each measuring hopper 7. The combinational weighing device 1 according to the first preferred embodiment previously sets the number (hereinafter referred to as "target introduction number N") of the measuring hoppers 7 performing introduction in one cycle.

The CPU 8 is connected with the respective components of the combinational weighing device 1 through an interface (not shown) and bus wires (not shown). The CPU 8 reads a program stored in the ROM 10 onto the RAM 9 and performs prescribed operations etc. thereby controlling the components of the combinational weighing device 1.

The memory device 11 preserving various data corresponds to a read/write hard disk or the like. This memory device 11 may alternatively be formed by a device such as a CD-ROM reader or a card reader employing a portable recording medium (a CD-ROM or a memory card).

Figure 2:
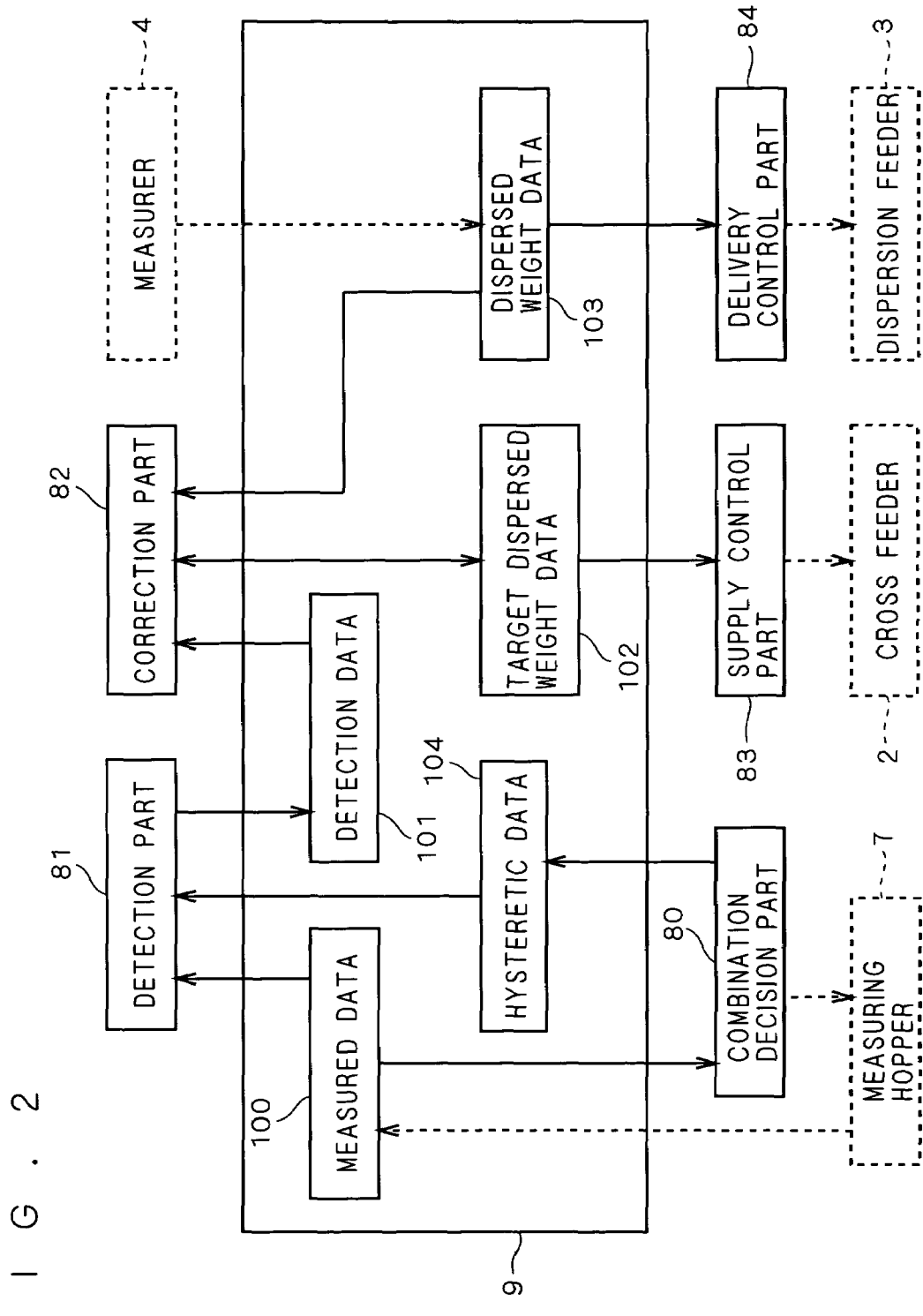
FIG. 2 is a block diagram showing a functional structure implemented by a CPU in the combinational weighing device according to the first preferred embodiment.

FIG. 2 is a block diagram showing a functional structure implemented by the CPU 8 of the combinational weighing device 1 according to the first preferred embodiment. The CPU 8 operates according to the program thereby implementing the functional structure formed by a combination decision part 80, a detection part 81, a correction part 82, a supply control part 83 and a delivery control part 84 shown in FIG. 2. While FIG. 2 illustrates the functional structure as to only each radiation feeder 5 and each measuring hopper 7, the combinational weighing device 1 according to the first preferred embodiment individually performs similar processing as to all radiation feeders 5 and all measuring hoppers 7.

The combination decision part 80 selects a combination of the measuring hoppers 7 exhibiting a total weight of bagged objects closest to the target measured value Tg on the basis of measured data 100 indicating the weight (transport quantity) of the group of the objects introduced into each measuring hopper 7. The combination decision part 80 also operates the on-off gate of each selected measuring hopper 7 for introducing the group of the objects held therein into the aforementioned collecting chute. The combination decision part 80 further adds up the weights of the groups introduced in the selected measuring hoppers 7 thereby obtaining a weight (hereinafter referred to as "bagged weight") of objects and generating hysteretic data 104. According to the first preferred embodiment, the memory device 11 properly receives and stores the hysteretic data 104 indicating information as to results of measurement such as the bagged weight every cycle and the number (hereinafter referred to as "introduction number M") of the measuring hoppers 7 performing introduction.

The detection part 81 detects an empty state of any radiation feeder 5 on the basis of the transport quantity indicated by the measured data 100 in response to whether or not this transport quantity is "0". The detection part 81 also refers to the hysteretic data 104 thereby comparing the bagged weight and the target measured value Tg with each other and detecting an oversupply state or a lightweight state as to the measuring state in the combinational weighing device 1. The detection part 81 further compares the introduction number M indicated by the hysteretic data 104 and the target introduction number N with each other thereby detecting the measuring state of the combinational weighing device 1. The detection part 81 generates detection data 101 in response to the result of detection of the measuring state.

The correction part 82 determines the supplied state of the objects on the dispersion feeder 3 on the basis of the detection data 101 indicating the result of detection of the detection part 81. In response to the result of this determination, the correction part 82 corrects a target dispersed weight DFt defining a target total value of the objects present on the dispersion feeder 3 indicated by the target dispersed weight data 102 and rewrites the target dispersed weight data 102.

The supply control part 83 controls the cross feeder 2 by PID control, a well-known technique, on the basis of the target dispersed weight DFt indicated by the target dispersed weight data 102.

The delivery control part 84 operationally obtains a driving duration T for the dispersion feeder 3 (base 31) in response to the dispersed weight data 103 indicating the dispersed weight, and controls the dispersion feeder 3.

The combinational weighing device 1 according to the first preferred embodiment has the aforementioned structure and functions. Each data generated on the RAM 9 is properly output to and stored in the memory device 11, and read from the memory device 11 onto the RAM 9 at need.

The operation of the combinational weighing device 1 bagging the objects by the target measured value Tg is now described. The CPU 8 controls the components of the combinational weighing device 1 unless otherwise stated.

Figure 3:
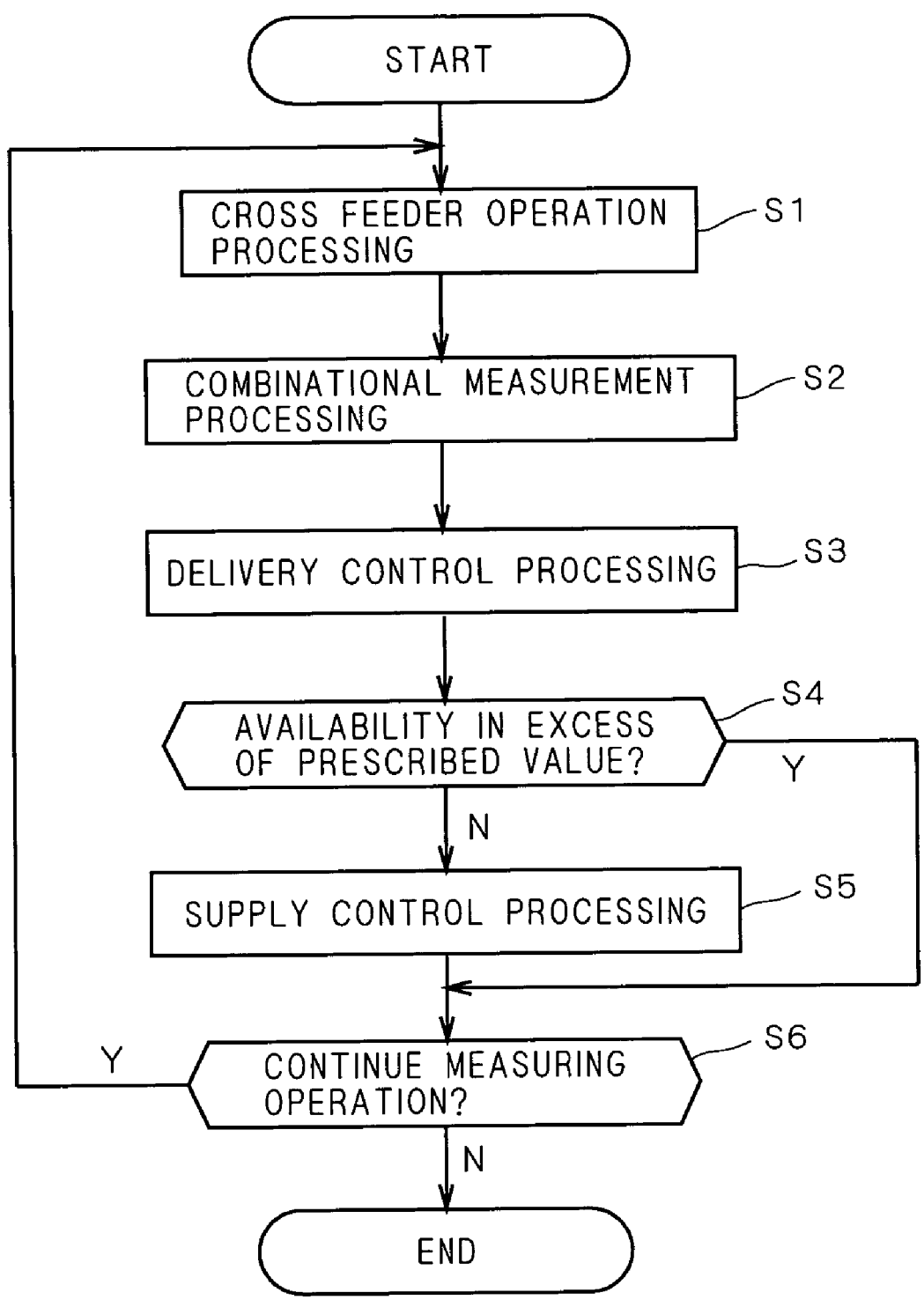
FIG. 3 is a flow chart showing operations of the combinational weighing device according to the first preferred embodiment.

FIG. 3 is a flow chart showing operations of the combinational weighing device 1 according to the first preferred embodiment. When starting the measuring and combining operation, the combinational weighing device 1 executes prescribed initialization (not shown). In this initialization, the combinational weighing device 1 sets the target measured value Tg, the target dispersed weight DFt, the target introduction number N, a driving duration Tini and the like and preserves the same in the memory device 11 as initial values.

Then, the supply control part 83 refers to the target dispersed weight data 102 and operates the cross feeder 2 by PID control for supplying the objects to the dispersion feeder 3 on the basis of the target dispersed weight DFt (step S1). In other words, the combinational weighing device 1 according to the first preferred embodiment properly controls the target dispersed weight DFt thereby controlling the distributed state of the objects on the dispersion feeder 3 (the supplied state to the dispersion feeder 3). The technique of controlling the target dispersed weight DFt is described later.

The control for the cross feeder 2 in the combinational weighing device 1 is not restricted to the PID control but may alternatively be performed by on-off control employing the target dispersed weight DFt, for example. More specifically, the combinational weighing device 1 executes the step S1 in parallel with subsequent processing.

Then, the combinational weighing device 1 executes combinational measurement processing (step S2). In the combinational measurement processing at the step S2, the delivery control part 84 continuously drives the dispersion feeder 3 by the driving duration T therefor previously obtained on the basis of the dispersed weight data 103. Thus, the dispersion feeder 3 dispersively supplies the objects to each radiation feeder 5 by the quantity responsive to the driving duration T. In other words, the combinational weighing device 1 according to the first preferred embodiment can control the delivery of the objects discharged from the dispersion feeder 3 by properly controlling the driving duration T. The technique of controlling the driving duration T is described later.

The combinational weighing device 1 vibrates/drives each radiation feeder 5 (driving mechanism 51) in parallel with vibration/driving of the dispersion feeder 3. Thus, the combinational weighing device 1 introduces the objects on each radiation feeder 5 into the corresponding pool hopper 6. At this time, the combinational weighing device 1 vibrates/drives only each radiation feeder 5 corresponding to each empty measuring hopper 7 among all radiation feeders 5.

When completely driving the dispersion feeder 3 and the radiation feeder 5 for one cycle, the combinational weighing device 1 opens the on-off gate of the pool hopper 6 supplied with the objects from the corresponding radiation feeder 5 for introducing the groups of the objects held in the pool hopper 6 into the corresponding measuring hopper 7. In other words, the combinational weighing device 1 newly introduces (transports) the object only into the empty measuring hopper 7.

The measuring hopper 7 newly receiving the group of the objects measures the weight (corresponding to the transport quantity) of the introduced group and outputs the result of the measurement to the CPU 8. The CPU 8 generates the measured data 100 on the basis of the weight of the group obtained every measuring hopper 7. The CPU 8 generates the measured data 100 in this cycle on the basis of the output as to the measuring hopper 7 newly outputting the result of measurement while generating the measured data 100 in this cycle on the basis of the weights of the group indicated in the precedent measured data 100 as to the remaining measuring hoppers 7.

When the combination measuring device 1 completely measures the groups of the object introduced into each measuring hopper 7 and generates the measured data 100 in this cycle, the combination decision part 80 determines a combination of groups introduced into measuring hoppers 7 for implementing a total weight (bagged weight) most approximate to the target measured value Tg on the basis of the measured data 100. The combination decision part 80 further selects the measuring hoppers 7 performing introduction in this cycle on the basis of the result of determination and outputs a control signal for opening the on-off gate to each selected measuring hopper 7. Thus, the selected measuring hopper 7 introduces the group of the object into the collecting chute so that the groups of the object is bagged through the discharge chute.

The combination decision part 80 further adds up the quantities of the groups introduced by the measuring hoppers 7 performing introduction thereby obtaining the bagged weight in this cycle and generating the hysteretic data 104. Thus, the combinational weighing device 1 terminates the combinational measurement processing at the step S2.

Figure 4:
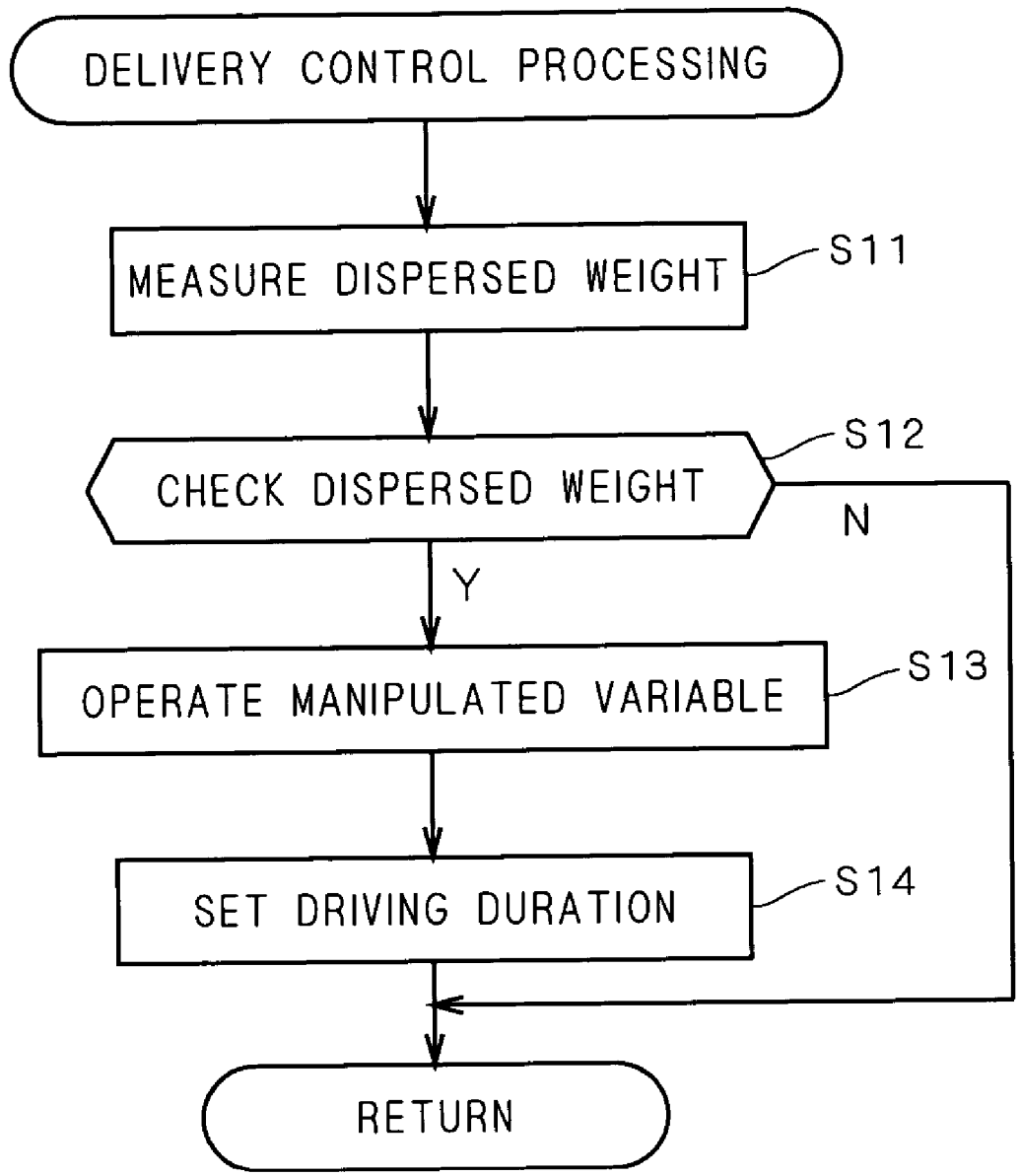
FIG. 4 is a flow chart showing delivery control processing in the combinational weighing device according to the first preferred embodiment.

When terminating the combinational measurement processing, the combinational weighing device 1 executes delivery control processing (step S3). FIG. 4 is a flow chart showing the delivery control processing. In this delivery control processing, the measurer 4 measures a dispersed weight DFw and outputs the result of this measurement to the CPU 8. Thus, the CPU 8 generates the dispersed weight data 103 (step S11).

When the CPU 8 generates the dispersed weight data 103, the delivery control part 84 refers to the target dispersed weight data 102 and the dispersed weight data 103 and compares the target dispersed weight DFt and the dispersed weight DFw with each other thereby checking the dispersed weight (step S12). More specifically, the delivery control part 84 determines whether or not the dispersed weight DFw is greater than the target dispersed weight DFt.

If the dispersed weight DFw is greater than the target dispersed weight DFt (YES at the step S12), the delivery control part 84 operates a manipulated variable Δt with respect to the driving duration T for the dispersion feeder 3 according to the following numerical equation (1), for example:

$$\Delta t = DFt/DFw \quad (1)$$

Then, the combinational weighing device 1 obtains the driving duration T according to the following numerical equation (2), for example, on the basis of the manipulated variable Δt and newly sets the same as the driving duration T employed by the delivery control part 84 in the aforementioned combinational measurement processing (step S2) (step S14).

$$T = \Delta t \times DFini \quad (2)$$

The combinational weighing device 1 employs a stored value DFini (not shown in FIG. 2) as the initial value of the driving duration T, and stores and employs this driving duration T every time the same is updated at a step S74.

In other words, the combinational weighing device 1 performs control so as to reduce the driving duration for the dispersion feeder 3 when the dispersed weight DFw is greater than the target dispersed weight DFt in response to the quantity (dispersed weight DFw) of the objects measured by the measurer 4.

Thus, the delivery control part 84 reduces the driving duration T for the dispersion feeder 3 if the dispersion feeder 3 is supplied with objects by a quantity greater than the target dispersed weight DFt, whereby the combinational weighing device 1 can inhibit the quantity of the objects discharged from the dispersion feeder 3 from being increased due to oversupply. Thus, the combinational weighing device 1 can perform efficient measurement.

If the dispersed weight DFw is not more than the target dispersed weight DFt (NO at the step S12), on the other hand, the combinational weighing device 1 skips the processing at the steps S13 and S14 thereby keeping the currently set driving duration T, terminating the delivery control processing and returns to the processing shown in FIG. 3.

Then, the combinational weighing device 1 determines whether or not the availability thereof is in excess of a prescribed value on the basis of the hysteretic data 104 (step S4). If determining that the availability is in excess of the prescribed value, the combinational weighing device 1 skips processing (step S5) of changing the target dispersed weight DFt.

Thus, the combinational weighing device 1 according to the first preferred embodiment maintains the operated target dispersed weight DFt, thereby maintaining the current control state. Therefore, the combinational weighing device 1 can suppress an unnecessary control operation and improve control efficiency. The availability can be obtained as the rate of the frequency at which the bagged weight is normal (within tolerance for the target measured value Tg) with respect to the operation frequency (the frequency of execution of the combinational measurement processing) of the combinational weighing device 1 on the basis of the bagged weight indicated by the hysteretic data 104, for example.

Figure 5:
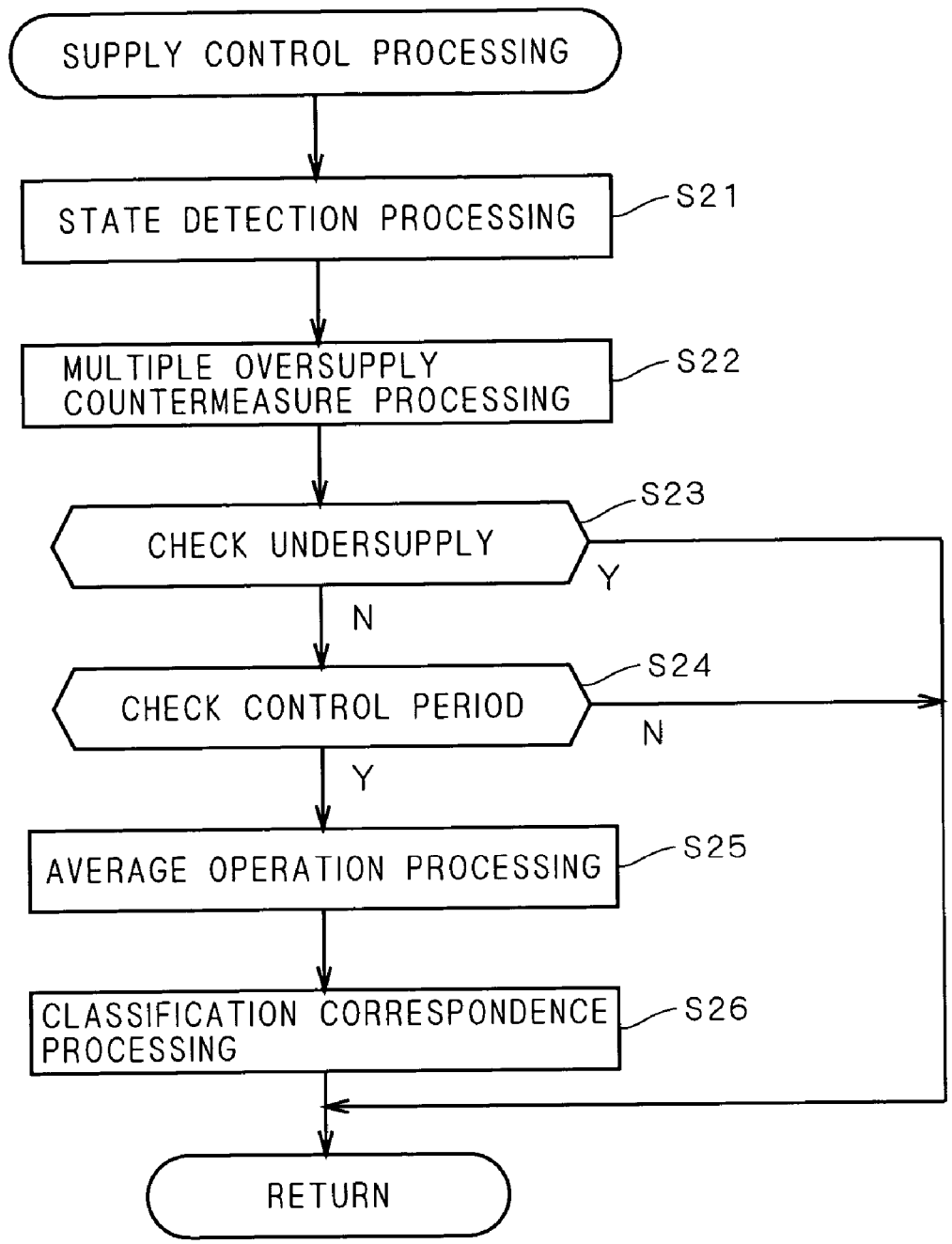
FIG. 5 is a flow chart showing supply control processing.

If the availability is less than the prescribed value (NO at the step S4), on the other hand, the combinational weighing device 1 executes supply control processing (step S5). FIG. 5 is a flow chart showing the supply control processing. In this supply control processing, the detection part 81 performs state detection of measurement in the combinational weighing device 1 (step S21).

At the step S21, the detection part 81 refers to the measured data 100 thereby detecting and counting the number (hereinafter referred to as "empty head number E")

of the measuring hoppers 7 having been in empty states in the combinational measurement processing and the number (hereinafter referred to as "selected head number M") of the measuring hoppers 7 performing introduction. Then, the detection part 81 refers to the hysteretic data 104 thereby detecting presence/absence of an oversupply state and a lightweight state in the combinational weighing device 1 and counts an oversupply frequency e1 and a lightweight frequency e2. Further, the detection part 81 generates the detection data 101 on the basis of the respectively detected values (numbers and frequencies). The oversupply state is either an overweight state or an overscale state. The term "overweight state" indicates a state where the bagged weight exceeds an "allowable weight" when a certain measuring hopper 7 cannot take part in the combination up to a previously defined frequency but forcibly takes part. The term "overscale state" indicates a state where the weight of the group of the objects introduced into the measuring hoper 7 per head exceeds the target measured value (+ upper limit). The term "lightweight state" indicates a measuring state where the bagged weight is less than the allowable weight.

Figure 6:
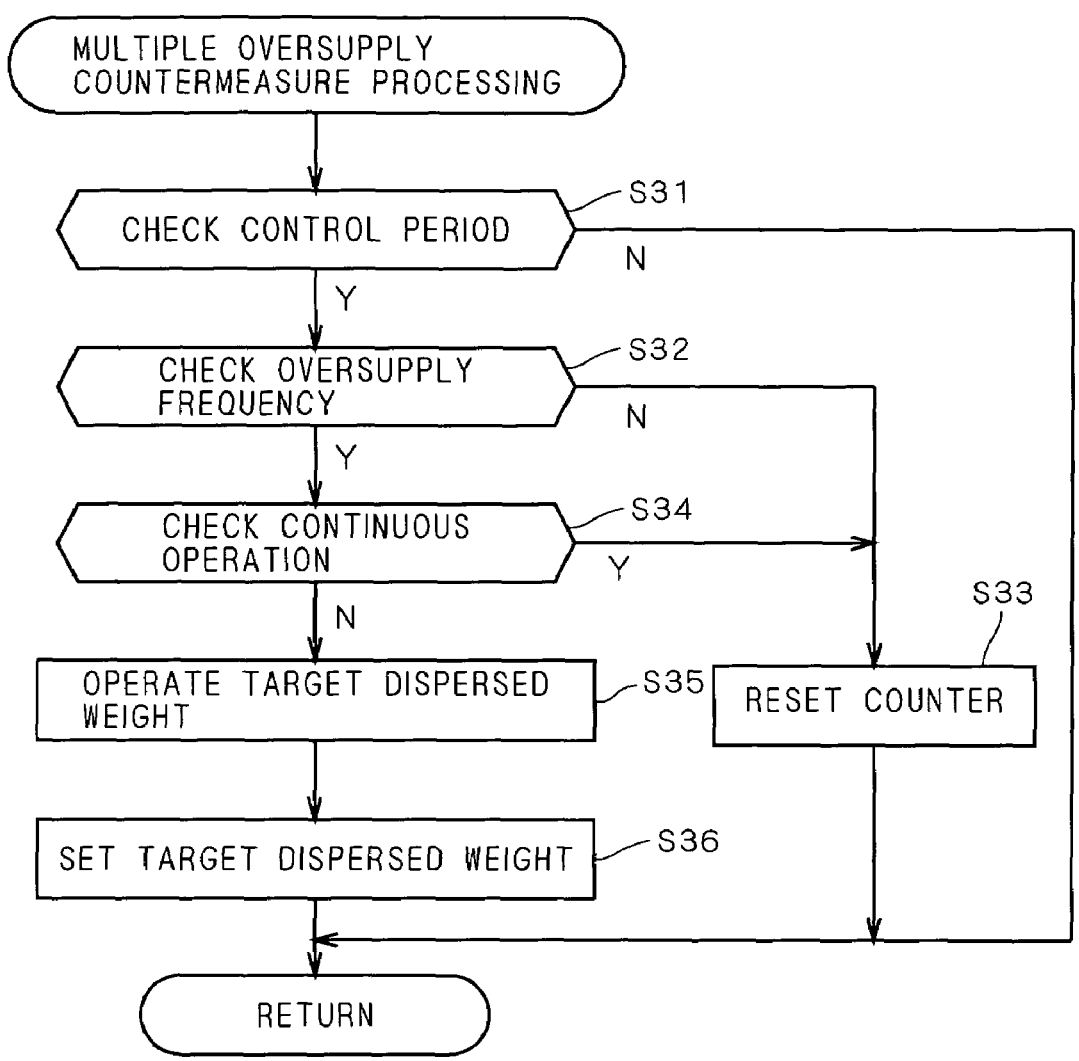
FIG. 6 is a flow chart showing multiple oversupply countermeasure processing.

When generating the detection data 101, the combinational weighing device 1 executes multiple oversupply countermeasure processing (step S22). FIG. 6 is a flow chart showing the multiple oversupply countermeasure processing. In this multiple oversupply countermeasure processing, the correction part 82 checks a control period as to whether or not the combinational weighing device 1 has performed an operation of a period definition frequency n0 (step S31). If having performed no operation of the period definition frequency n0, the combinational weighing device 1 skips processing of steps S32 to S36, terminates the multiple oversupply countermeasure processing and returns to the processing shown in FIG. 5.

If the combinational weighing device 1 has terminated the operation of the period definition frequency n0 in correspondence to the control period (YES at the step S31), on the other hand, the correction part 82 refers to the detection data 101 thereby determining whether or not the oversupply frequency e1 is in excess of a prescribed value (step S32). According to this processing, the combinational weighing device 1 determines whether or not the oversupply frequency e1 is in excess of the prescribed value every time the same performs the operation of the period definition frequency n0. This corresponds to processing of obtaining incidence (n1/n0) of the oversupply state in the combinational weighing device 1 and determining whether or not this incidence is in excess of a prescribed value, and corresponds to a determination as to whether or not the oversupply state takes place in a multiple manner.

Thus, the combinational weighing device 1 detects a state where oversupply takes place in a multiple manner on the basis of the incidence of the oversupply state. Therefore, the combinational weighing device 1 can perform efficient measurement by taking countermeasures against the multiple oversupply state according to processing described later and correcting the target dispersed weight DFt.

If the oversupply frequency e1 is less than the prescribed value in the determination at the step S32 (NO at the step S32), the correction part 82 resets a continuous frequency counter. Then, the combinational weighing device 1 terminates the multiple oversupply countermeasure processing and returns to the processing shown in FIG. 5. The continuous frequency counter is a counter indicating a frequency at which the combinational weighing device 1 has continuously performed processing (steps S35 and S36) against the multiple oversupply state (state of making a determination of YES at the step S32).

If the oversupply frequency e1 is in excess of the prescribed value (YES at the step S32), on the other hand, the combinational weighing device 1 performs continuous operation check on the basis of the value of the continuous frequency counter (step S34). The combinational weighing device 1 according to the first preferred embodiment determines whether or not the value of the continuous frequency counter is "1" at the step S34. In other words, the combinational weighing device 1 resets the continuous frequency counter if executing the steps S35 and S36 (making a determination of YES at the step S34) in the precedent control period for terminating the multiple oversupply countermeasure processing and returning to the processing shown in FIG. 5. In other words, the correction part 82 makes control so that the frequency for continuously performing the processing at the steps S35 and S36 described later to not more than the prescribed frequency (once in the first preferred embodiment).

If the value of the continuous frequency counter is "0", the correction part 82 operates a new target dispersed weight DFtn (step S35). The correction part 82 can execute the processing at the step S35 according to the following numerical equation (3), for example:

$$DFtn = Kp \times DFt \qquad (3)$$

where Kp represents a numerical value (hereinafter referred to as "correction factor") indicating the degree of correction of the target dispersed weight DFt, satisfying (Kp<1) at the step S35.

The correction part 82 executes the following numerical equation (4) thereby setting the new target dispersed weight DFtn as the target dispersed weight DFt (step S36) while incrementing the continuous frequency counter. In other words, the correction part 82 rewrites the target dispersed weight data 102 to the newly obtained target dispersed weight DFtn to be referred in subsequent processing (step S1, for example).

$$DFt = DFtn \qquad (4)$$

The target dispersed weight DFt is reduced due to the execution of the numerical equations (3) and (4), for thereafter reducing the quantity of the objects supplied from the cross feeder 2 to the dispersion feeder 3 in the control of the supply control part 83 (step S1). Thus, the combinational weighing device 1 is inhibited from the oversupply state due to the reduction of the quantities of each group.

The correction part 82 makes control not to continuously execute the processing at the steps S35 and S36 in excess of a prescribed frequency thereby preventing overcontrol resulting from repetition of similar processing up to attainment of an effect of eliminating the oversupply state by reduction of the quantities of each group due to the processing of converting the target dispersed weight DFt. The control period depending on the period definition frequency n0 can be relatively reduced due to this control, whereby responsibility can be ensured with respect to the multiple oversupply state.

When generating the new target dispersed weight data 102, the combinational weighing device 1 terminates the multiple oversupply countermeasure processing and returns to the processing shown in FIG. 5.

When terminating the multiple oversupply countermeasure processing at the step S22, the combinational weighing device 1 refers to the dispersed weight data 103 and determines whether or not the dispersed weight DFw is not more than a prescribed value thereby checking undersupply thereof (step S23). If supply of the objects is insufficient, the combinational weighing device 1 skips processing at steps S24 to S26, terminates the supply control processing and returns to the processing shown in FIG. 3. In this case, the combinational weighing device 1 may terminate its operations.

If the supply of the objects to the combinational weighing device 1 is sufficient, on the other hand, the correction part 82 performs control period check as to whether or not the operation of the period definition frequency n1 has been performed (step S24) so that the combinational weighing device 1 skips the processing at the steps S25 and S26, terminates the supply control processing and returns to the processing shown in FIG. 3 if no operation of the period definition frequency n1 has been performed.

If the operation of the period definition frequency n1 has already been performed (YES at the step S24), the combinational weighing device 1 refers to the detection data 101 thereby operating an average value (E/n3) of the empty head number E and an average value (M/n3) of the selected head number M during the operation of the period definition frequency n1 respectively (step S25).

Figure 7:
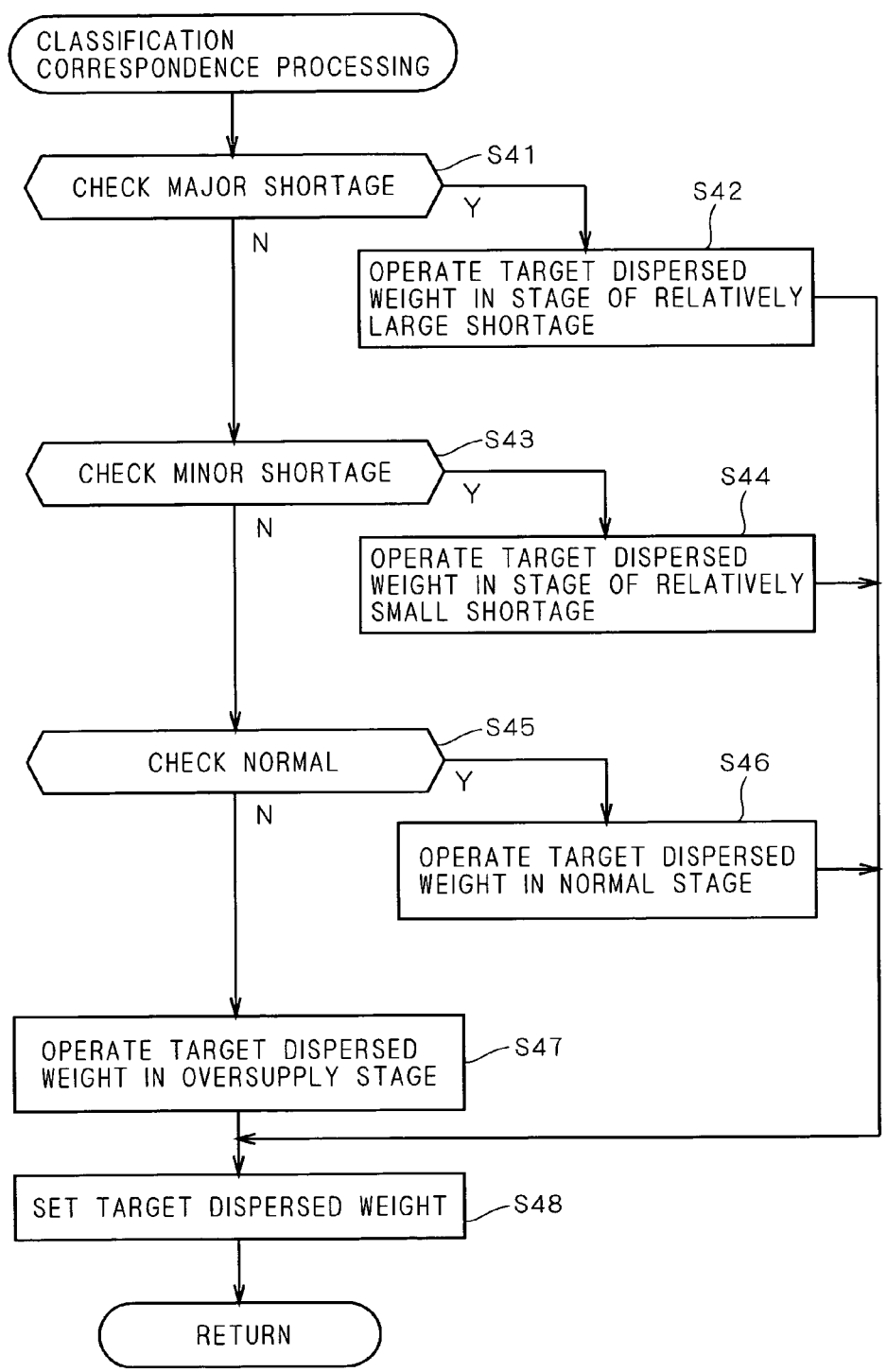
FIG. 7 is a flow chart showing classification correspondence processing.

When obtaining the average values of the empty head number E and the selected head number M, the combinational weighing device 1 executes classification correspondence processing (step S26). FIG. 7 is a flow chart showing the classification correspondence processing, and FIG. 8 illustrates correction factors Kp in respective stages classified in response to the measuring state of the combinational weighing device 1.

In this classification correspondence processing, the combinational weighing device 1 according to the first preferred embodiment determines the state of the objects supplied onto the dispersion feeder 3 in classification into any of four stages of "major shortage", "minor shortage", "normal" and "oversupply" as shown in FIG. 8. The degree of shortage of the objects is relatively large in the major shortage stage, while this degree is relatively small in the minor shortage stage. The quantity of the objects is large in the oversupply stage.

In other words, the correction part 82 determines whether or not the supplied state with respect to the dispersion feeder 3 of the combinational weighing device 1 is "major shortage" on the basis of the detection data 101 (step S41). The correction part 82 makes a determination of "major shortage" when the lightweight frequency e2 is in excess of a prescribed defined frequency or the average value of the empty head number E is in excess of a prescribed number (1, for example). When determining that the state of the dispersion feeder 3 is in the stage of "major shortage", the combinational weighing device 1 executes a step S42.

Briefly stated, the combinational weighing device 1 selects a correction factor Kp from among the correction factors Kr1 to Krn shown in FIG. 8 through the correction part 82 on the basis of a counter counting the frequency of continuously executing the processing at the step S42 and executes the numerical equation (3) thereby operating the target dispersed weight DFtn. The correction factors Kr1 to Krn preferably satisfy the following relation:

$$Kr1 \geq Kr2 \geq Kr3 \geq \ldots \geq Krn \geq 1 \tag{5}$$

Therefore, it is possible to prevent overcontrol while ensuring responsibility of control in "major shortage" when continuously executing the processing at the step S42 by selecting the correction factor Kp through the correction part 82 to satisfy the relation shown in the numerical equation (5) in response to the frequency of continuous execution of the step S42 and operating the new target dispersed weight DFtn.

If the supplied state to the dispersion feeder 3 is not "major shortage" (NO at the step S41), the correction part 82 further determines whether or not the supplied state is "minor shortage" (step S43). The correction part 82 makes a determination of "minor shortage" when the average value of the empty head number E is in excess of a prescribed number (0.5, for example) or the average value of the selected head number M is greater than a prescribed range with respect to the target introduction number N. When determining that the supplied state to the dispersion feeder 3 is in the stage of "minor shortage", the combinational weighing device 1 executes a step S44.

Briefly stated, the combinational weighing device 1 selects the correction factor Kp from among the correction factors Ks1 to Ksn shown in FIG. 8 through the correction part 82 on the basis of a counter counting a frequency of continuously executing the processing at the step S44 and executes the numerical equation (4) thereby operating the target dispersed weight DFtn. The correction factors Ks1 to Ksn preferably satisfy the following relation:

$$Ks1 \geq Ks2 \geq Ks3 \geq \ldots \geq Ksn \geq 1 \tag{6}$$

Therefore, it is possible to prevent overcontrol while ensuring responsibility of control in "minor shortage" when continuously executing the processing at the step S44 by selecting the correction factor Kp through the correction part 82 to satisfy the relation shown in the numerical equation (6) in response to the continuous frequency and operating the new target dispersed weight DFtn.

If the supplied state to the dispersion feeder 3 is neither "major shortage" nor "minor shortage" (NO at the step S43), the correction part 82 further determines whether or not the supplied state is "normal" (step S45). The correction part 82 makes a determination of "normal" when the average value of the selected head number M is within a prescribed range with respect to the target introduction number N. When determining that the supplied state to the dispersion feeder 3 is in the stage of "normal", the combinational weighing device 1 executes a step S46.

Briefly stated, the combinational weighing device 1 selects the correction factor Kp from among the correction factors Kt1 to Ktn shown in FIG. 8 through the correction part 82 on the basis of a counter counting the frequency of continuously executing the processing at the step S46 and executes the numerical equation (3) thereby operating the target dispersed weight DFtn. The correction factors Kt1 to Ktn preferably satisfy the following relation:

$$Kt1 \leq Kt2 \leq Kt3 \leq \ldots \leq Ktn \leq 1 \tag{7}$$

Therefore, it is possible to prevent overcontrol while ensuring responsibility of control in the stage of classifying the supplied state with respect to the dispersion feeder 3 as "normal" when continuously executing the processing at the step S46 by selecting the correction factor Kp through the correction part 82 to satisfy the relation shown in the numerical equation (7) in response to the frequency of continuous execution of the step S46 and operating the new target dispersed weight DFtn.

If the supplied state to the dispersion feeder 3 is none of "major shortage", "minor shortage" and "normal" (NO at the step S45), the correction part 82 regards that the supplied state to the dispersion feeder 3 is "oversupply" and executes processing at a step S47.

Briefly stated, the combinational weighing device 1 selects the correction factor Kp from among the correction factors Ku1 to Kun shown in FIG. 8 through the correction part 82 on the basis of a counter counting the frequency of continuously executing the processing at the step S47 and executes the numerical equation (3) thereby operating the target dispersed weight DFtn. The correction factors Ku1 to Kun preferably satisfy the following relation:

$$Ku1 \leq Ku2 \leq Ku3 \leq \ldots \leq Kun \leq 1 \qquad (8)$$

Therefore, it is possible to prevent overcontrol while ensuring responsibility of control in the stage of classifying the supplied state to the dispersion feeder 3 is as "oversupply" when continuously executing the processing at the step S47 by selecting the correction factor Kp through the correction part 82 to satisfy the relation shown in the numerical equation (8) in response to the frequency of continuous execution of the step S47 and operating the new target dispersed weight DFtn.

When terminating the operation of the target dispersed weight DFtn in each stage (step S42, S44, S46 or S47), the correction part 82 executes the numerical equation (4) thereby regarding the newly obtained target dispersed weight DFtn as the target dispersed weight DFt and rewrites the target dispersed weight data 102 (step S48). Further, the combinational weighing device 1 terminates the classification correspondence processing and returns to the processing shown in FIG. 5 while terminating the supply control processing and returning to the processing shown in FIG. 3.

Therefore, the supply control part 83 thereafter controls the cross feeder 2 on the basis of the newly corrected target dispersed weight DFt, thereby properly controlling the quantity of the objects supplied to the dispersion feeder 3.

Thus, the combinational weighing device 1 according to the first preferred embodiment determines the supplied state to the dispersion feeder 3 in classification into any of a plurality of stages for correcting the target dispersed weight DFt while changing the correction quantity (correction factor Kp) for the target dispersed weight DFt in response to the classified stage, thereby enabling correction further responsive to the situation and further improving the measurement efficiency.

When terminating the supply control processing at the step S5 shown in FIG. 3, the combinational weighing device 1 determines whether or not to further continue the measuring operation (step S6). The combinational weighing device 1 repetitively executes the processing at the steps S1 to S5 when continuing the measuring operation, while terminating the processing when not continuing the measuring operation.

As hereinabove described, the combinational weighing device 1 according to the first preferred embodiment can correct the target dispersed weight DFt in response to the detection data 101 generated on the basis of the measured data 100. Therefore, the combinational weighing device 1 can correct the target dispersed weight DFt in response to the actually measured value, thereby improving accuracy of control of the supply to the dispersion feeder 3 as compared with a case of making control on the basis of only a previously set value dissimilarly to the prior art.

Further, the combinational weighing device 1 can control the supply to the dispersion feeder 3 without employing a specific mechanism such as a driving mechanism precisely driving a scattering prevention cylinder, whereby the device structure is not uselessly complicated.

In addition, the combinational weighing device 1 controls the target dispersed weight DFt on the basis of the value (the quantity of the group of the objects introduced into each measuring hopper 7) to be most precisely controlled in order to improve the measurement efficiency of the combinational weighing device 1, thereby further improving the measurement efficiency.

Further, the combinational weighing device 1 determines the supplied state to the dispersion feeder 3 in classification into any of a plurality of stages for correcting the target dispersed weight DFt while changing the correction quantity (correction factor Kp) for the target dispersed weight DFt in response to the classified stage, thereby enabling correction further responsive to the situation and further improving the measurement efficiency.

Further, the combinational weighing device 1 employs the continuous frequency counter for making correction while varying the correction quantity for the target dispersed weight DFt in response to the continuous frequency thereby preventing overcontrol while ensuring responsibility of control with respect to each stage.

Further, the combinational weighing device 1 obtains the incidence of the oversupply state on the basis of the measuring state and corrects the target dispersed weight DFt to reduce the dispersed weight DFw when the incidence is in excess of a prescribed value. When the combinational weighing device 1 is in the multiple oversupply state, therefore, it is possible to quickly correct the dispersed weight DFw to a proper value for making efficient measurement.

Further, the combinational weighing device 1 employs the continuous frequency counter for correcting the target dispersed weight DFt at a prescribed ratio (1/2 in the first preferred embodiment) when the incidence of the oversupply state continuously exceeds a prescribed value, thereby preventing overcontrol while ensuring responsibility in the multiple oversupply state.

Figure 9:
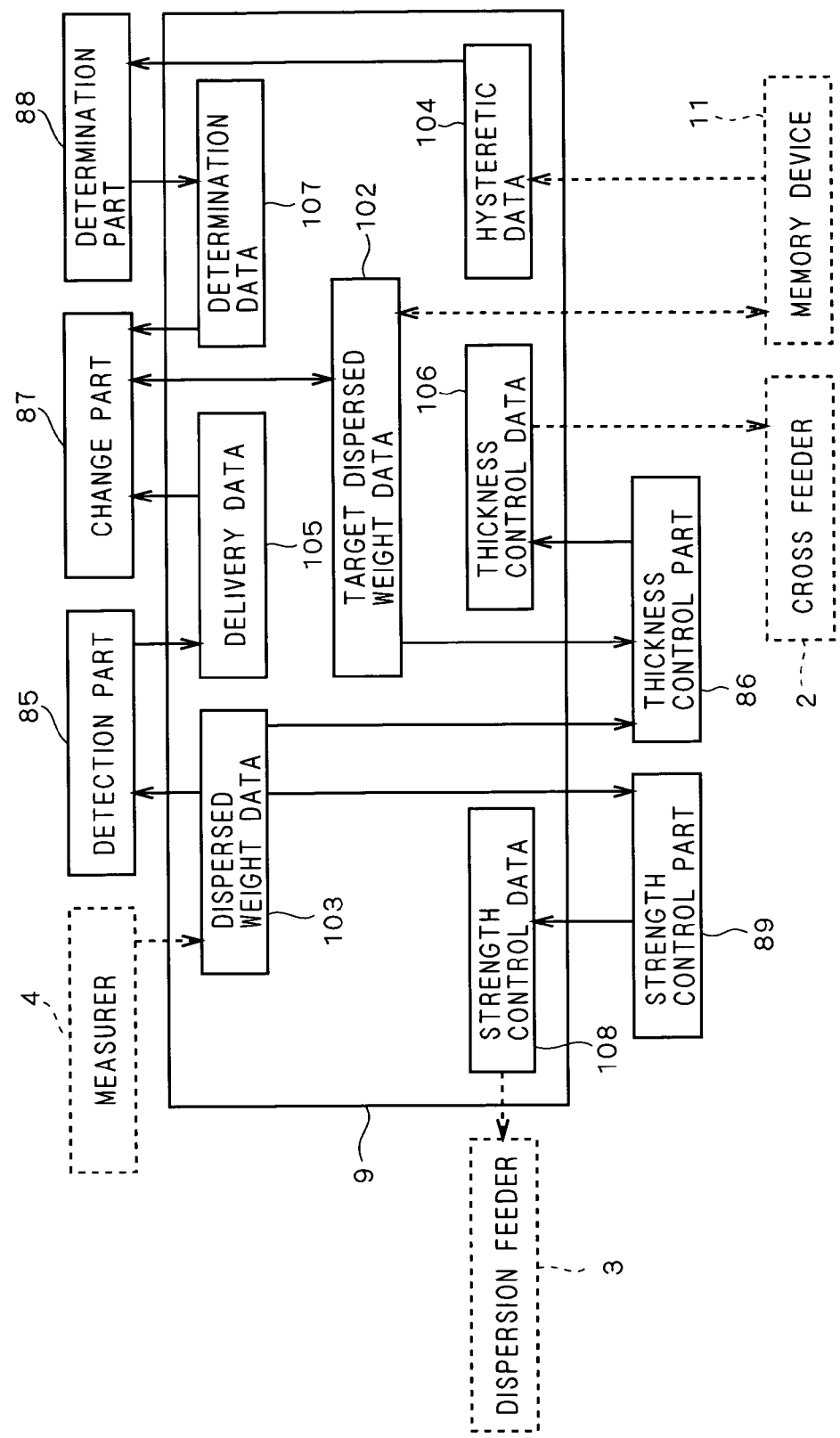
FIG. 9 is a block diagram showing a functional structure implemented by a CPU in a combinational weighing device according to a second preferred embodiment of the present invention.

FIG. 9 is a block diagram showing a functional structure implemented by a CPU 8 of a combinational weighing device 1a according to a second preferred embodiment of the present invention. The CPU 8 operates according to a program thereby implementing the functional structure formed by a detection part 85, a thickness control part 86, a change part 87, a determination part 88 and a strength control part 89 shown in FIG. 9.

The detection part 85 detects the delivery of objects discharged from a dispersion feeder 3 on the basis of dispersed weight data 103 indicating a result of measurement of a dispersed weight transmitted from a measurer 4 and generates delivery data 105. Briefly stated, the detection part 85 refers to the dispersed weight data 103 every cycle, operates difference between results of measurement before and after each cycle and determines fluctuation of the dispersed weight. If the dispersed weight is reduced, the detection part 85 regards the difference obtained by the aforementioned operation as the delivery of the objects discharged from the dispersion feeder 3.

The thickness control part 86 generates thickness control data 106 on the basis of the dispersed weight data 103 and target dispersed weight data 102. The combinational weighing device 1a previously sets the initial value of the target dispersed weight DFt when starting, and stores the same in a memory device 11. The thickness control data 106 is employed for on-off controlling a driving mechanism 21 for a cross feeder 2. According to the second preferred embodiment, the combinational weighing device 1a turns on the driving mechanism 21 when the value of the thickness control data 106 is "1", while the former turns off the latter when the value of the thickness control data 106 is "0". In other words, the thickness control part 86 generates the thickness control data 106 thereby controlling the quantity of the objects supplied from the cross feeder 2 to the dispersion feeder 3.

The change part 87 refers to the target dispersed weight data 102 and changes the target dispersed weight DFt so that the delivery of the objects reaches a target measured value on the basis of the delivery data 105 indicating the delivery of the objects detected by the detection part 85. The change part 87 also has a function of changing the target dispersed weight DFt on the basis of a measuring state for the objects in the combinational weighing device 1a. The change part 87 decides whether or not to execute this change processing on the basis of a result of determination indicated by determination data 107.

The determination part 88 determines suitability of change of the target dispersed weight DFt by the change part 87 on the basis of hysteretic data 104 stored in the memory device 11 and generates the determination data 107 indicating the result of this determination. The hysteretic data 104 indicates the bagged weight bagged in each cycle of the combinational weighing device 1a. The bagged weight can be obtained by adding up the weights of groups of objects measured by respective measuring hoppers 7 introducing the group of objects into a collecting chute in each cycle. The determination part 88 refers to the hysteretic data 104, detects overscale or lightweight of the measuring state in each cycle and generates the determination data 107 in response to the result of this detection. The term "overscale" indicates a measuring state in a case where the bagged weight in this cycle is greater than an allowable weight while the term "lightweight" indicates a measuring state in a case where the bagged weight is less than the allowable weight in selection of an optimum combination.

The strength control part 89 changes strength control data 108 on the basis of the dispersed weight data 103. The strength control data 108 indicates a strength parameter Da for setting vibration strength (more specifically, the amplitude of vibration) for a base 31 of the dispersion feeder 3, and the initial value thereof is previously set. The delivery of the objects from the dispersion feeder 3 depends on the vibration strength (driving strength) for a dispersion table 30, and hence the strength control part 89 controls the driving strength for the dispersion feeder 3 by changing the strength parameter Da on the basis of the target weight data 103.

The combinational weighing device 1a according to the second preferred embodiment has the aforementioned structure and functions. An operation of the combinational weighing device 1a bagging the objects by a target measured value Tg is now described. The CPU 8 controls the components of the combinational weighing device 1a on the basis of control signals unless otherwise stated.

Figure 10:
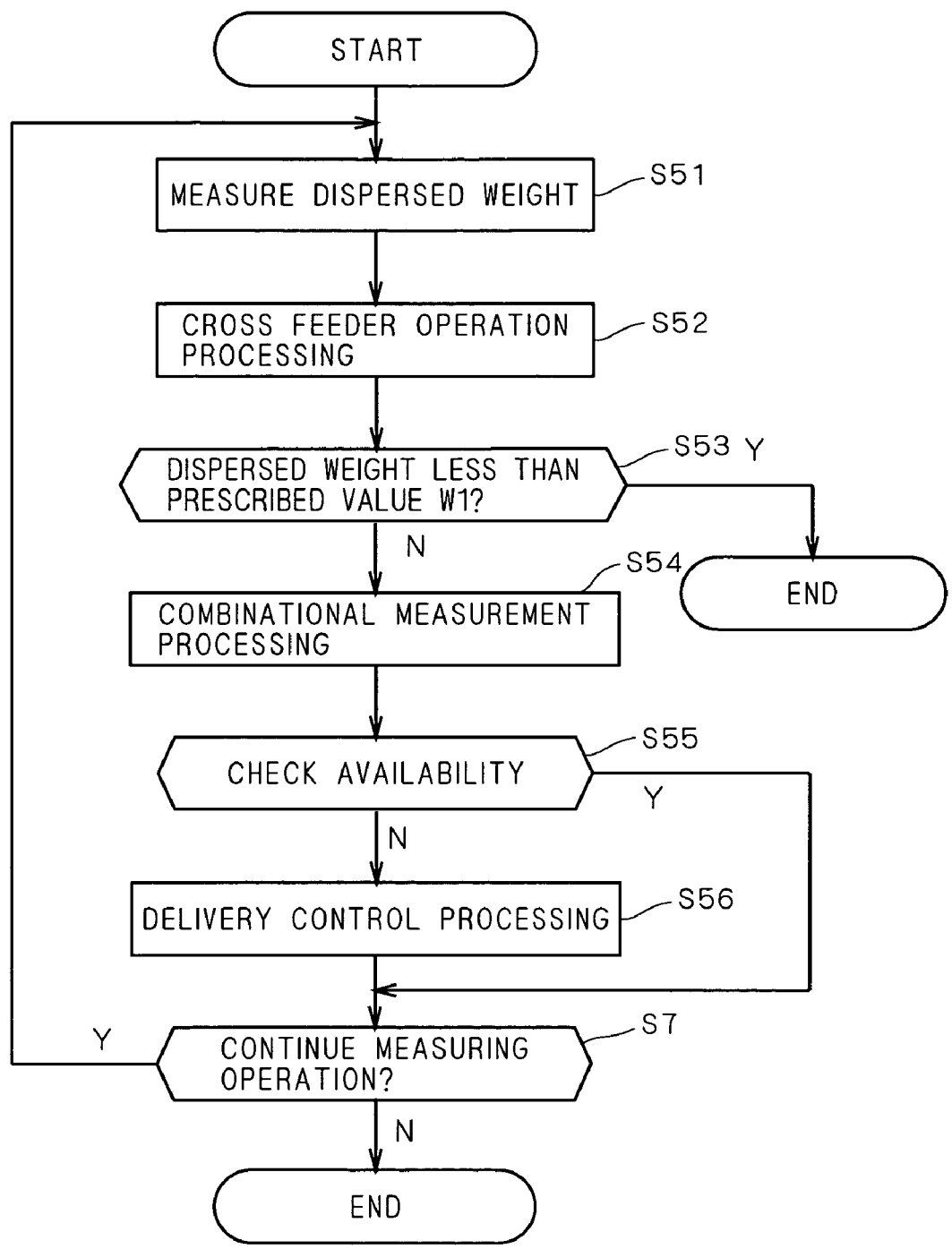
FIG. 10 is a flow chart showing operations of the combinational weighing device according to the second preferred embodiment.

FIG. 10 is a flow chart showing operations of the combinational weighing device 1a according to the second preferred embodiment. When starting the measuring operation, the combinational weighing device 1a executes prescribed initialization (not shown).

In this initialization, the combinational weighing device 1a sets the target measured value Tg, the target dispersed weight DFt and the vibration strength (the strength parameter Da) for the base 31 thereby generating the target dispersed weight data 102, the strength control data 108 etc.

and preserves the same in the memory device 11 as initial values. In the initialization, further, the combinational weighing device 1a sets the type of a language (one of multifarious languages such as Japanese, English etc.) displayed on a display part 12 in response to an operator. Thus, the operator can operate the combinational weighing device 1a with his/her favorite language, to be capable of improving working efficiency.

Then, the combinational weighing device 1a measures the dispersed weight through the measurer 4 and generates the dispersed weight data 103 (step S51), and the thickness control part 86 generates the thickness control data 106 on the basis of the dispersed weight data 103 and the target dispersed weight data 102 for executing operation processing of the cross feeder 2 (step S52).

More specifically, the thickness control part 86 sets the thickness control data 106 to "1" when the dispersed weight indicated by the dispersed weight data 103 is not more than the target dispersed weight DFt indicated by the target dispersed weight data 102. Thus, the combinational weighing device 1a drives the driving mechanism 21 for the cross feeder 2. When the dispersed weight is less than the target dispersed weight DFt, the quantity of the objects present on the dispersion feeder 3 is so small that the combinational weighing device 1a supplies additional objects to the dispersion feeder 3 thereby preventing insufficiency of the objects on the dispersion feeder 3.

If the dispersed weight is in excess of an upper limit, the thickness control part 86 sets the thickness control data 106 to "0". Thus, the combinational weighing device 1a stops the driving mechanism 21 for the cross feeder 2. The dispersed weight exceeds the upper limit when the quantity of the objects present on the dispersion feeder 3 is so large that the combinational weighing device 1a stops the driving mechanism 21 not to supply excess objects to the dispersion feeder 3. The thickness control part 86 keeps the thickness control data 106 unchanged in a state other than the above, and hence the driving state for the cross feeder 2 is not changed if the dispersed weight is greater than the target dispersed weight DFt and less than the upper limit.

Thus, the combinational weighing device 1a on-off controls the cross feeder 2 through the thickness control part 86 on the basis of the target dispersed weight DFt and the prescribed upper limit. Thus, the combinational weighing device 1a can control the thickness of the objects present on the dispersion feeder 3 (hereinafter simply referred to as "thickness") substantially constant. The thickness depends on the target dispersed weight DFt, and hence the combinational weighing device 1a controls the target dispersed weight DFt to attain a desired thickness (thickness for attaining a desired delivery) in processing described later.

Then, the detection part 85 determines whether or not the dispersed weight measured at the step S51 is less than a prescribed value W1 (step S53), so that the combinational weighing device 1a regards the supply as insufficient and terminates the operation if the dispersed weight is less than the prescribed value W1.

Thus, the combinational weighing device 1a can remove an unnecessary operation when undersupply takes place, thereby improving the operation efficiency thereof.

This termination is an abend resulting from undersupply of the objects. The combinational weighing device 1a makes screen display of a warning or the like on the display part 12 when causing abnormality, not only with the language set in the initialization but also with another language. Thus, the combinational weighing device 1a can also inform an operator unfamiliar with the set language, for example, of the abnormality, in order to quickly restore the combinational weighing device 1a. The combinational weighing device 1a according to the second preferred embodiment can arbitrarily set the prescribed value W1 in the initialization or the like, so that the operator can properly set the same by operating an operation part 13 in response to the objects or the target measured value Tg.

If the dispersed weight is in excess of the prescribed value W1 (NO at the step S53), the combinational weighing device 1a executes combinational measurement processing (step S54). Briefly stated, the combinational weighing device 1a drives the dispersion feeder 3 with the vibration strength set in the strength control data 108 (drives the base 31 with the strength parameter Da) in the combinational measurement processing at the step S54. Thus, the dispersion feeder 3 dispersively discharges the objects to each radiation feeder 5. The combinational weighing device 1a vibrates/drives each driving mechanism 51 for transporting the objects through each radiation feeder 5. An on-off gate of each pool hopper 6 is closed at this time so that the pool hopper 6 temporarily holds the object transported through the radiation feeder 5. The combinational weighing device 1a drives only the driving mechanism 51 for the radiation feeder 5 corresponding to each empty measuring hopper 7.

When completely driving the dispersion feeder 3 and each radiation feeder 5 for one cycle, the pool hopper 6, corresponding to the empty measuring hopper 7, receiving the object from the radiation feeder 5 opens the on-off gate and introduces the held object into the measuring hopper 7.

Then, each measuring hopper 7 measures the weight of the introduced group of objects and outputs the result of the measurement to the CPU 8. The CPU 8 determines a combination of groups of objects introduced into the measuring hoppers 7 exhibiting a total weight closest to the target measured value Tg on the basis of the weight of the group of objects obtained every measuring hopper 7 and selects the measuring hoppers 7 introducing the objects in this cycle. The CPU 8 further makes control to open the on-off gates of the selected measuring hoppers 7 and operates the total quantity of the objects introduced by the measuring hoppers 7 for obtaining the bagged weight thereby generating the hysteretic data 104 in this cycle.

The combinational weighing device 1a bags the groups of objects introduced from the measuring hoppers 7 into the collecting chute and discharges the same. The combinational weighing device 1a executes the combinational measurement processing at the step S4 in the aforementioned manner.

When terminating the combinational measurement processing, the combinational weighing device 1a obtains the availability thereof on the basis of the hysteretic data 104 and skips a step S6 if the availability is in excess of a prescribed value (step S55).

Figure 11:
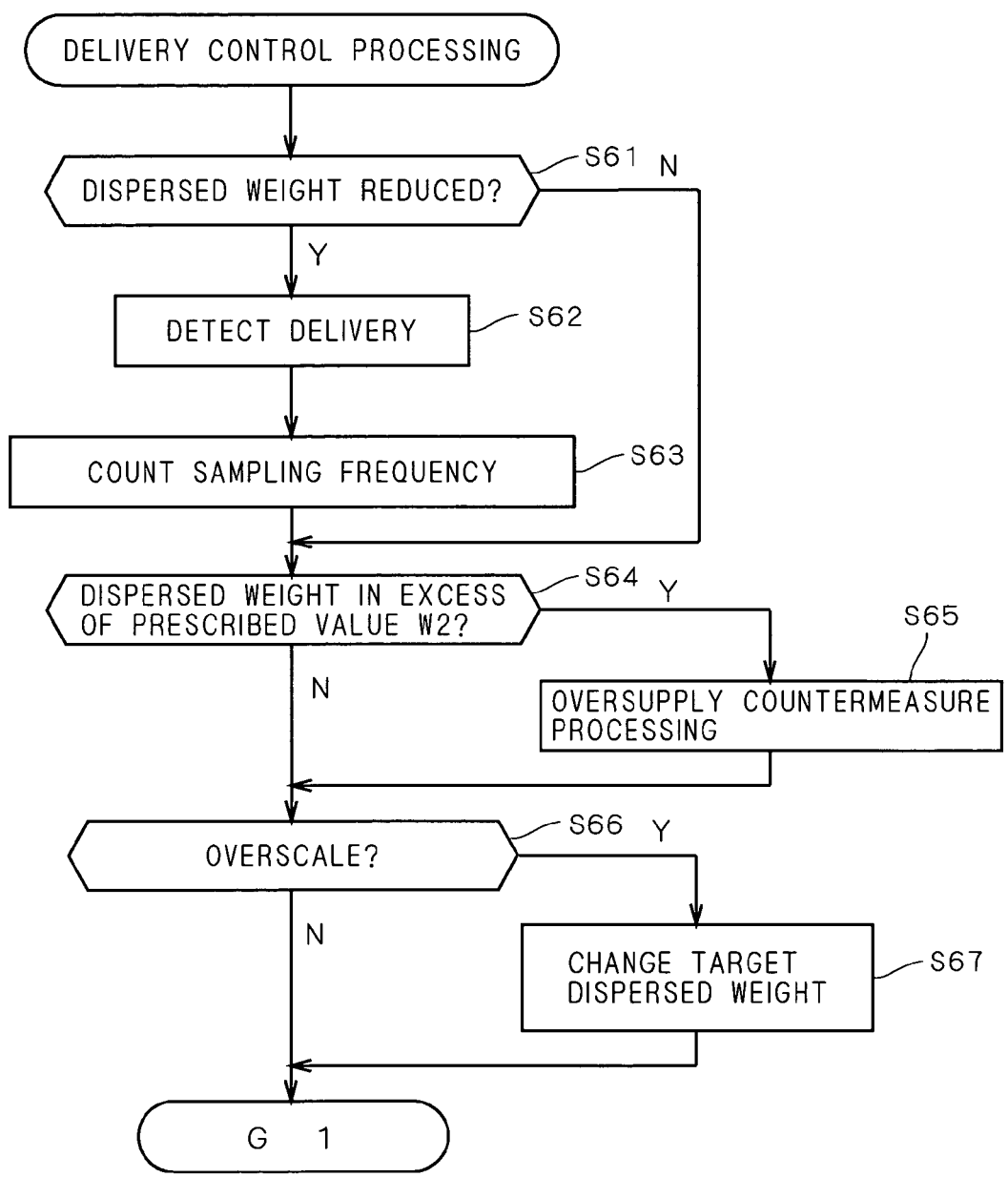
FIGS. 11 and 12 are flow charts showing delivery control processing.
Figure 12:
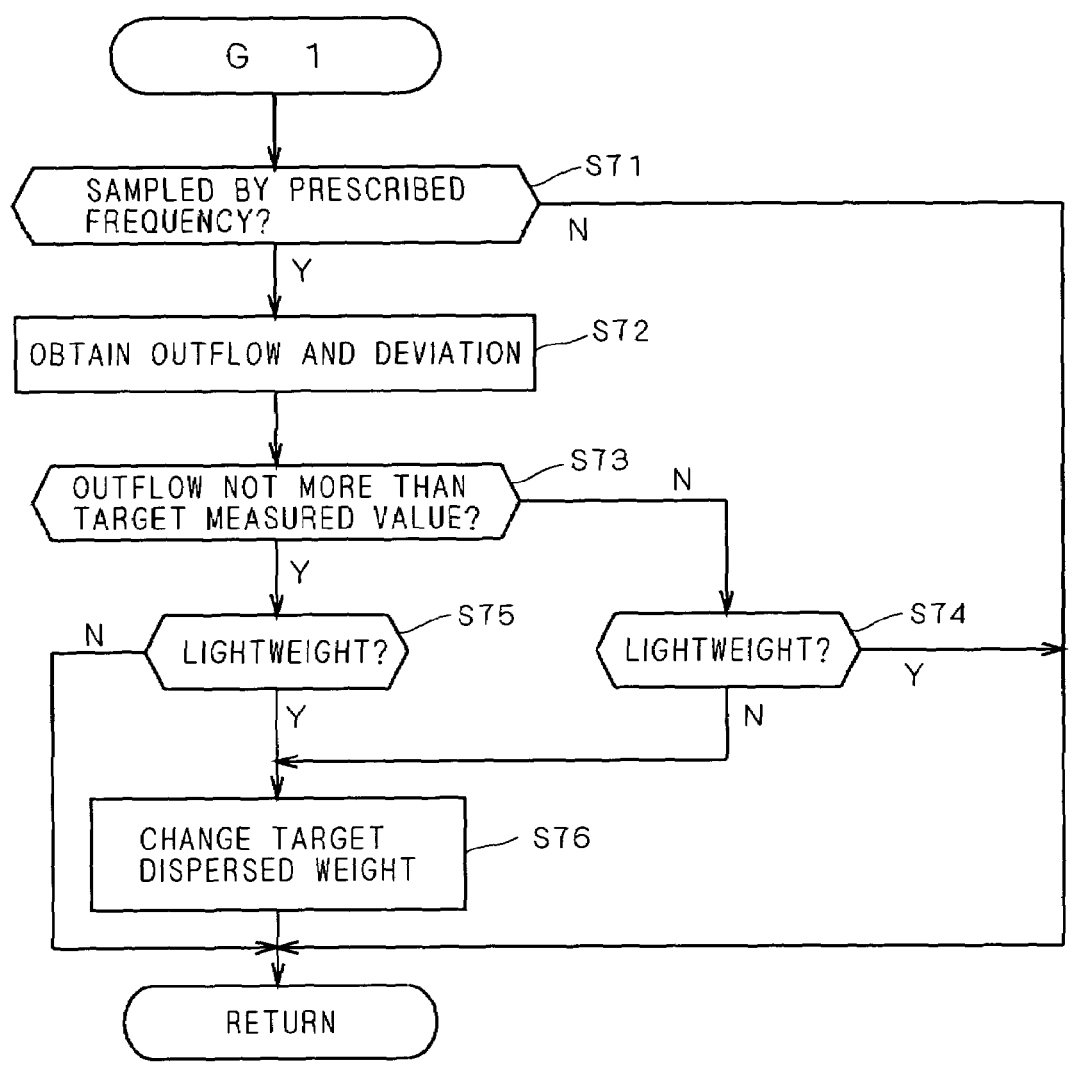

If the availability is less than the prescribed value (NO at the step S55), on the other hand, the combinational weighing device 1a executes delivery control processing (step 56). FIGS. 11 and 12 are flow charts showing the delivery control processing at the step S56. In the delivery control processing, the detection part 85 determines whether or not the dispersed weight is reduced on the basis of the dispersed weight data 103 (step S61).

When the dispersed weight is reduced in the combinational weighing device 1a, the combinational weighing device 1a can be regarded as stopping supplying the objects to the dispersion feeder 3 and performing only discharge of the objects from the dispersion feeder 3. In other words, difference between a dispersed weight in a precedent cycle and the dispersed weight in this cycle corresponds to the delivery of the dispersion feeder 3 in the precedent cycle in this case. Therefore, the detection part 85 subtracts the dispersed weight in this cycle from that in the precedent cycle on the basis of the dispersed weight data 103 thereby obtaining the difference therebetween and determines whether or not this difference is in excess of "0" thereby determining whether or not the dispersed weight is reduced.

If the dispersed weight is reduced (YES at the step S61), the detection part 85 detects the aforementioned difference as the delivery from the dispersion feeder 3 (step S62), counts the frequency of sampling the delivery (step S63) and generates the delivery data 105. If the dispersed weight is not reduced (NO at the step S61), on the other hand, the detection part 85 does not operate the delivery but the combinational weighing device 1a skips the steps S62 and S63.

Then, the strength control part 89 refers to the dispersed weight data 103 thereby determining whether or not the dispersed weight is in excess of a prescribed value W2 (step S64) so that the combinational weighing device 1a performs oversupply countermeasure processing only when the dispersed weight is in excess of the prescribed value W2 (step S65). The combinational weighing device 1a according to the second preferred embodiment can arbitrarily set the prescribed value W2 in the initialization or the like so that the operator can properly set the same by operating the operation part 13.

Figure 13:
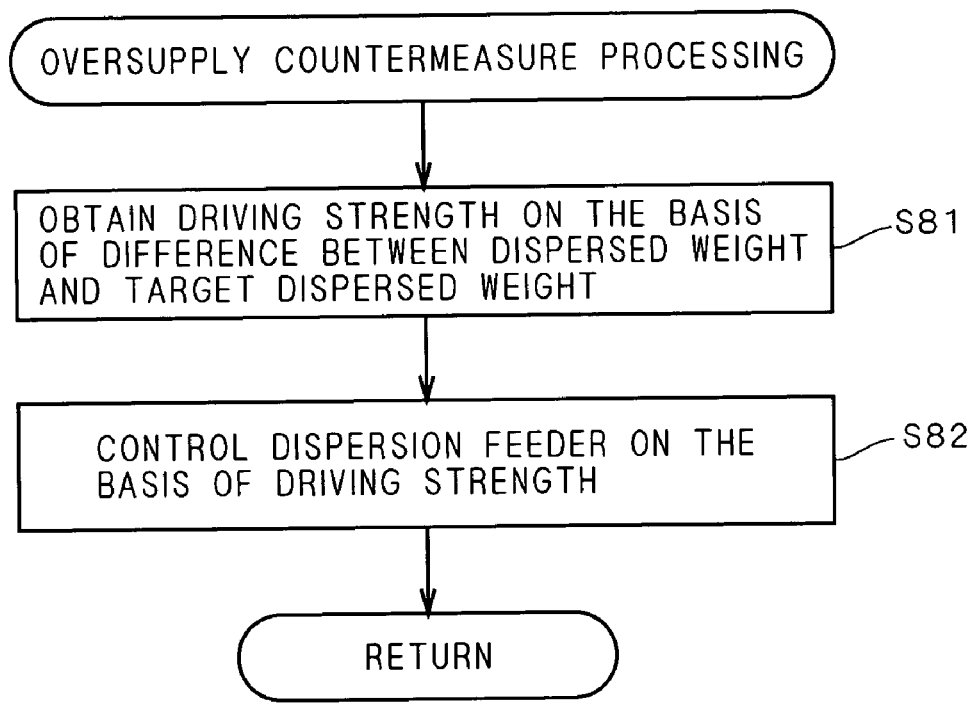
FIG. 13 is a flow chart showing oversupply countermeasure processing in the combinational weighing device according to the second embodiment in detail.

FIG. 13 is a flow chart showing the oversupply countermeasure processing at the step S65 in detail. In the oversupply countermeasure processing, the strength control part 89 refers to the target dispersed weight data 102 and the dispersed weight data 103 and obtains driving strength for the dispersion feeder 3 on the basis of difference $\varepsilon r$ between the target dispersed weight DFt and the dispersed weight (step S81). The driving strength can be obtained by obtaining a strength parameter Da according to the following numerical equation (9) with a proportionality factor K, for example:

$$Da = Da - K \times \varepsilon r \qquad (9)$$

The strength control part 89 further drives the base 31 with the obtained strength parameter Da thereby the base 31 of the dispersion feeder 3 is driven/controlled with desired driving strength (step S82). More correctly, the combinational weighing device 1a preserves the strength parameter Da obtained according to the numerical equation (9) as new strength control data 108 at the step S82, and drives the base 31 according to the strength parameter Da shown by the strength control data 108 in the combinational measurement processing (step S54 in FIG. 10) as described above. If the dispersed weight is less than the prescribed value W2, the combinational weighing device 1a does not execute the step S82 (skips the same through the step S64), thereby maintaining the current strength control data 108 and keeping the driving strength for the dispersion feeder 3 unchanged.

Thus, the combinational weighing device 1a can reduce the quantity of the objects discharged from the dispersion feeder 3 by reducing the driving strength for the dispersion feeder 3 also when oversupplying the objects to the dispersion feeder 3 (the dispersed weight is in excess of the prescribed value W2) due to change of working environment or the like. Therefore, the combinational weighing device 1a can readily control the delivery of the objects from the dispersion feeder 3 in response to the working environment. While the combinational weighing device 1a according to the second preferred embodiment controls the strength of the dispersion feeder 3 by an indiscrete method in response to the dispersed weight, the present invention is not restricted to this but the former may alternatively discretely control the latter with a plurality of thresholds.

When setting new driving strength and rewriting the strength control data 108 through the strength control part 89, the combinational weighing device 1a terminates the oversupply countermeasure processing and returns to the processing shown in FIG. 11.

Then, the determination part 88 determines whether or not overscale takes place on the basis of the hysteretic data 104, determines that the target dispersed weight DFt must be changed only when overscale takes place, and generates the determination data 107 indicating the result of this determination (step S66). When the determination data 107 indicates the purport that the target dispersed weight DFt must be changed, the change part 87 changes the target dispersed weight DFt of the target dispersed weight data 102 to a value reduced by a prescribed quantity (step S67). This processing corresponds to an operation of performing the so-called feed forward control on the target dispersed weight DFt with a referee condition of presence/absence of overscale in the measuring state of the combinational weighing device 1a.

Thus, the thickness control part 86 thereafter controls the cross feeder 2 on the basis of the target dispersed weight DFt changed by the change part 87 when the combinational weighing device 1a executes the step S52 shown in FIG. 10. This new target dispersed weight DFt is lower than the precedent one and hence the supply to the dispersion feeder 3 is reduced to reduce the thickness when the thickness control part 86 controls the cross feeder 2 with the new target dispersed weight DFt. Therefore, the quantity of the objects discharged from the dispersion feeder 3 is reduced to inhibit the measuring state from overscale. In other words, the combinational weighing device 1a can properly control the quantity of the objects supplied onto the dispersion feeder 3 in response to the working environment without separately providing a control mechanism including a scattering prevention cylinder or the like dissimilarly to the prior art.

The change part 87 changes the target dispersed weight DFt by a prescribed quantity in response to the measuring state of the combinational weighing device 1a for the objects, whereby the combinational weighing device 1a can readily control the supply from the cross feeder 2 to the dispersion feeder 3 according to the thickness control part 86 when causing abnormality such as overscale of the measuring state.

Then, the change part 87 determines whether or not the delivery is sampled by a prescribed frequency on the basis of the delivery data 105 (step S71), so that the combinational weighing device 1a skips processing at steps S72 to S77 and returns to the processing shown in FIG. 10 if sampling is not yet performed by the prescribed frequency.

If sampling has already been performed by the prescribed frequency (YES at the step S71), on the other hand, the change part 87 obtains an average value (hereinafter referred to as "outflow DFo") of deliveries corresponding to a plurality of times and deviation e1 on the basis of the delivery data 105 (step S72).

More specifically, the change part 87 obtains the outflow DFo on the basis of the deliveries corresponding to the plurality of times indicated by the delivery data 105 and obtains the deviation e1 between the outflow DFo and the target measured value Tg as follows:

$$e1 = Tg - DFo \tag{10}$$

When obtaining the outflow DFo and the deviation e1, the change part 87 compares the obtained outflow DFo and the target measured value Tg with each other thereby determining whether or not the outflow DFo is not more than the target measured value Tg (step S73).

If the outflow DFo is not more than the target measured value Tg (YES at the step S73), the determination part 88 refers to the hysteretic data 104, determines whether or not the measuring state is lightweight and generates the determination data 107 indicating a purport that the target dispersed weight DFt must be changed only when lightweight takes place (step S75). In this case, the change part 87 obtains a new target dispersed weight DFtn on the basis of the outflow DFo and the deviation e1 obtained at the step S73 with reference to the current target dispersed weight DFt indicated by the target dispersed weight data 102 according to the following numerical equation (11) with a proportionality factor Kp:

$$DFtn = DFt + Kp \times e1 \tag{11}$$

Further, the change part 87 changes the target dispersed weight data 102 so that the newly obtained target dispersed weight DFtn is referred to as a subsequent target dispersed weight DFt (step S76).

Also when the outflow DFo is greater than the target measured value Tg (NO at the step S73), the determination part 88 determines whether or not lightweight takes place. If the outflow DFo is greater than the target measured value Tg, however, the determination part 88 generates the determination data 107 indicating the purport that the target dispersed weight DFt must be changed only when no lightweight takes place (step S74). Also in this case, the change part 87 operates the target dispersed weight DFtn according to the numerical equation (11) on the basis of the outflow DFo and the deviation e1 obtained at the step S73 and rewrites the target dispersed weight data 102 thereby changing the target dispersed weight DFt (step S76).

In other words, the change part 87 of the combinational weighing device 1a reduces the target dispersed weight DFt when the delivery (the outflow DFo) from the dispersion feeder 3 is greater than the target measured value Tg while increasing the target dispersed weight DFt when the former is not more than the latter. Therefore, the combinational weighing device 1a can change the target dispersed weight DFt on the basis of the delivery of the objects detected by the detection part 85. At the step S52 shown in FIG. 10, the thickness control part 86 controls the supply (the thickness of the objects on the dispersion feeder 3) from the cross feeder 2 on the basis of the target dispersed weight DFt indicated by the target dispersed weight data 102, whereby the combinational weighing device 1a can properly control the quantity of the objects supplied to the dispersion feeder 3 in response to the working environment without complicating the device structure. Thus, the combinational weighing device 1a can efficiently weigh and combine the group of objects.

Further, the combinational weighing device 1a can suppress oversupply/undersupply of the object in the radiation feeder 5 or the like by making control so that the delivery from the dispersion feeder 3 and the quantity (the target measured value Tg) of the objects consumed in the combinational weighing device 1a are substantially equal to each other. Therefore, the combinational weighing device 1a can stabilize its operations. While the combinational weighing device 1a according to the second preferred embodiment performs the aforementioned control on the basis of the average value (the outflow DFo) of the delivery corresponding to a prescribed frequency, the same may alternatively perform such control every time obtaining a delivery for one cycle.

Further, the determination part 88 determines suitability of change of the target dispersed weight DFt by the change part 87 in response to the measuring state of the combinational weighing device 1a for the objects, whereby the combinational weighing device 1a can improve its control efficiency while preventing useless change of the target dispersed weight DFt.

Referring again to FIG. 10, the combinational weighing device 1a determines whether or not to further continue the measuring operation (step S57) when terminating the delivery control processing at the step S56, for repeating the processing from the step S51 only when continuing the same otherwise terminating the processing.

Thus, the combinational weighing device 1a according to the second preferred embodiment changes the target dispersed weight DFt serving as a parameter for driving/controlling the cross feeder 2 in response to the working environment, thereby properly controlling the quantity of the objects supplied to the dispersion feeder 3 without complicating the device structure and with no influence by the working environment.

Further, the combinational weighing device 1a can stabilize its operations by changing the target dispersed weight so that the delivery from the dispersion feeder 3 reaches the target measured value.

In addition, the combinational weighing device 1a can readily control the supply to the dispersion feeder 3 without a complicated operation by changing the target dispersed weight by the prescribed quantity on the basis of the measuring state for the objects.

The combinational weighing device 1a according to the second preferred embodiment controls the delivery of the objects from the dispersion feeder 3 by controlling the vibration strength for the dispersion feeder 3. However, the delivery of the objects from the dispersion feeder 3, depending on the vibration time of the dispersion feeder 3, can also be controlled by controlling the vibration time (driving time).

Figure 14:
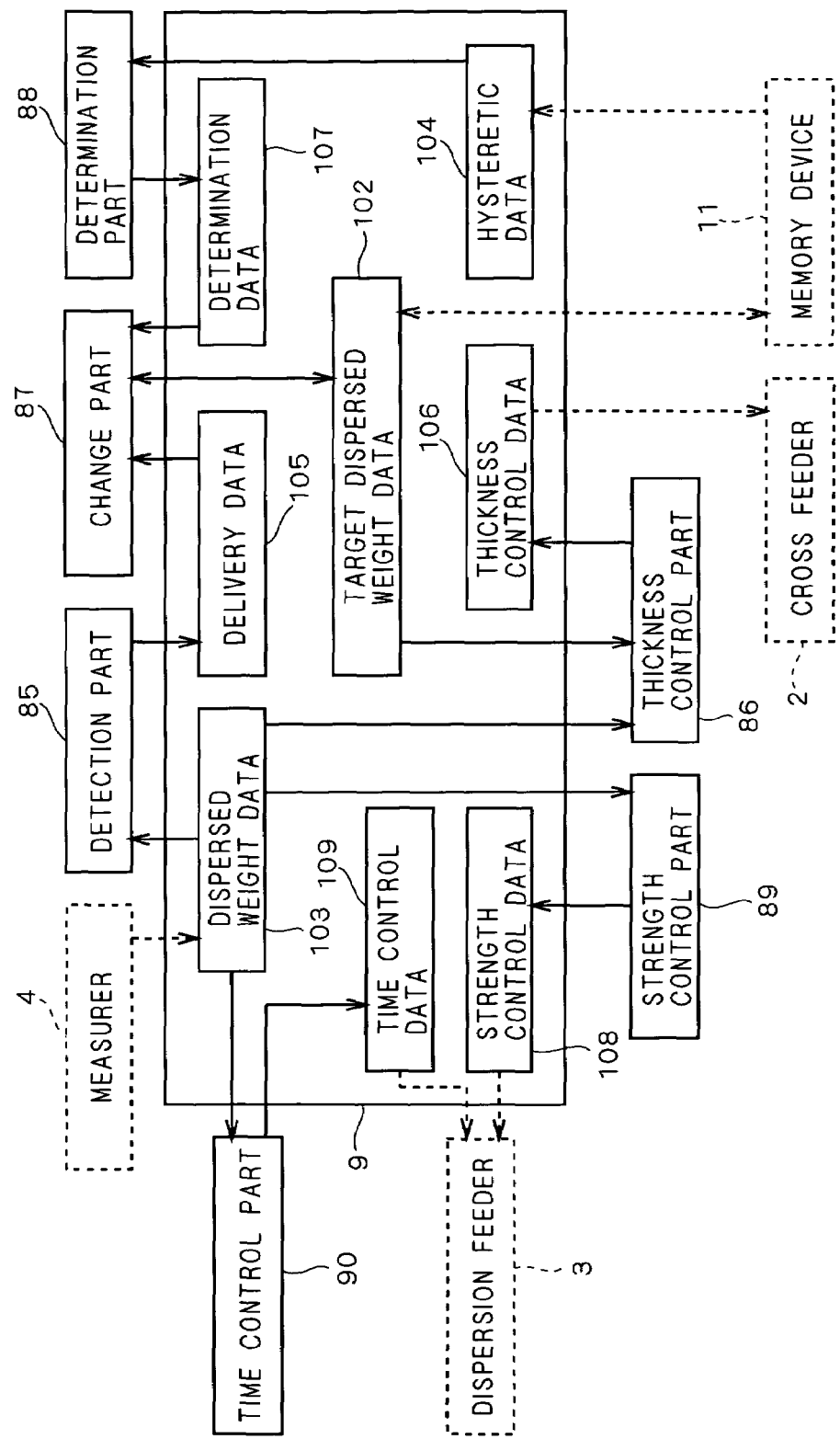
FIG. 14 is a block diagram showing a functional structure implemented by a CPU in a combinational weighing device according to a third preferred embodiment of the present invention.

FIG. 14 is a block diagram showing a functional structure in a combinational weighing device 1b according to a third preferred embodiment of the present invention constituted on the basis of such a principle. The combinational weighing device 1b according to the third preferred embodiment is different from the combinational weighing device 1a according to the second preferred embodiment in a point that the same has a time control part 85 generating time control data 109 on the basis of dispersed weight data 103. As to the remaining structure of the combinational weighing device 1b, redundant description is omitted. The time control data 109 indicates a driving time Dt for a base 31 of a dispersion feeder 3.

The combinational weighing device 1b according to the third preferred embodiment performs operations substantially similar to those of the combinational weighing device 1a according to the second preferred embodiment, except the contents of oversupply countermeasure processing shown in FIG. 13. FIG. 15 is a flow chart showing the oversupply countermeasure processing of the combinational weighing device 1b according to the third preferred embodiment. The combinational weighing device 1b according to the third preferred embodiment executes the oversupply countermeasure processing only when a dispersed weight is in excess of a prescribed value W2, similarly to the second preferred embodiment (step S65 in FIG. 11).

First, a strength control part 89 refers to target dispersed weight data 102 and dispersed weight data 103 for obtaining driving strength for the dispersion feeder 3 on the basis of difference εr between a target dispersed weight DFt and the dispersed weight while the time control part 85 obtains the driving time for the dispersion feeder 3 (step S91). The time control part 85 can obtain the driving time Dt for the dispersion feeder 3 according to the following numerical equation (12) with a proportionality factor Kr:

$$Dt = Dt - Kr \times \epsilon r \quad (12)$$

The combinational weighing device 1b drives the base 31 by the driving time Dt with driving strength decided by a strength parameter Da obtained according to the numerical equation (9) similarly to the second preferred embodiment, thereby driving the dispersion feeder 3 (step S92). More correctly, the combinational weighing device 1b preserves the strength parameter Da obtained according to the numerical equation (9) as new strength control data 108 while preserving the driving time Dt obtained according to the numerical equation (12) as new time control data 109, similarly to the second preferred embodiment. The combinational weighing device 1b executes processing of actually driving the base 31 on the basis of these data in combinational measurement processing (step S54 in FIG. 10) as described above. If the dispersed weight is less than the prescribed value W2, the combinational weighing device 1b executes no step S92 similarly to the second preferred embodiment, thereby maintaining the current strength control data 108 and the current time control data 109 and keeping the driving strength and the driving time for the dispersion feeder 3 unchanged.

Thus, the combinational weighing device 1b according to the third preferred embodiment can attain effects similar to those of the combinational weighing device 1a according to the second preferred embodiment. Further, the combinational weighing device 1b can control the delivery from the dispersion feeder 3 over a wide range by controlling not only the driving strength but also the driving time also when employing a driving mechanism (the base 31) having a narrow adjustment width for the driving strength.

While the combinational weighing device 1 according to the first preferred embodiment determines the supplied state to the dispersion feeder 3 in classification into any of four stages as hereinabove described, the present invention is not restricted to this but the former may alternatively determine the latter in further fragmentation.

While the detection part 85 obtains the difference between the precedent dispersed weight and the current dispersed weight on the basis of the dispersed weight data 103 thereby detecting the delivery from the dispersion feeder 3 in each of the combinational weighing devices 1a and 1b according to the second and third preferred embodiments, the combinational weighing device 1a or 1b may alternatively employ a device directly measuring the delivery.

While the CPU 8 controls the components of the combinational weighing device 1, 1a or 1b according to a software program, a dedicated arithmetic circuit having such functions may alternatively be provided for implementing the control.

While the ROM 10 previously stores and runs the program in each of the aforementioned preferred embodiments, the memory device 11 may alternatively previously read the program from a CD-ROM or the like for storing the same and thereafter running the same.

The operation method executed by the CPU 8 is not restricted to that shown in each of the aforementioned preferred embodiments but any mathematical technique or any operational expression may be employed so far as the same can attain similar effects.

The procedure of each processing is not restricted to that shown in each of the aforementioned preferred embodiments. For example, the combinational weighing device 1 may alternatively make a determination to detect the supplied state to the dispersion feeder 3 from "oversupply".

While the invention has been shown and described in detail, the foregoing description is in all aspects illustrative and not restrictive. It is therefore understood that numerous modifications and variations can be devised without departing from the scope of the invention.

What is claimed is:

1. A combinational weighing device for weighing respective groups of objects to determine a partial combination of the groups of objects having a total weight approximating to a target combination weight, said device comprising:
   a first transport element transporting objects supplied;
   a dispersion element dispersing the objects transported by said first transport element;
   a supply control element controlling said first transport element on the basis of a target dispersed weight which is a target of total weight of the objects present on said dispersion element;
   a plurality of second transport elements transporting respective groups of objects dispersed by said dispersion element;
   a weight measuring element measuring respective weights of said transported groups of objects transported by said plurality of second transport elements;
   a detection element detecting an empty state of any second transport element and a measuring state of said combinational weighing device on the basis of said respective weights of said groups of objects measured by said weight measuring element; and
   a correction element determining a supply state of the objects onto said dispersion element on the basis of the result of detection of said detection element, and correcting said target dispersed weight based on the determined supply state.

2. The combinational weighing device according to claim 1, wherein
   said correction element determines said supply state in one of a plurality of stages, and corrects said target dispersed weight by a correction quantity depending on the stage determined.

3. The combinational weighing device according to claim 2, wherein
   said correction quantity for each stage is determined in response to a continuous occurrence frequency of said each stage.

4. The combinational weighing device according to claim 1, wherein
   said detection element obtains an incidence of an oversupply state in said combinational weighing device on the basis of said measuring state in said combinational weighing device so that said correction element corrects said target dispersed weight when said incidence is in excess of a prescribed value.

5. The combinational weighing device according to claim 4, wherein
   said correction element sets a frequency for continuously correcting said target dispersed weight to not more than a prescribed frequency when said incidence continuously exceeds said prescribed value.

6. The combinational weighing device according to claim 1, further comprising:
   a dispersed weight measuring element measuring the total weight of the objects present on said dispersion element, and
   a delivery control element controlling a driving duration for said dispersion element in response to the total weight of the objects measured by said dispersed weight measuring element.

7. A combinational weighing device for measuring respective groups of objects to determine a partial combination of the groups of objects having a total weight approximating to a target combination weight, said device comprising:
   a transport element transporting objects supplied;
   a dispersion element dispersing the objects transported by said transport element;
   a dispersed weight measuring element measuring the total weight of the objects present on said dispersion element;
   a detection element detecting the delivery weight of the objects discharged by said dispersion element on the basis of the total weight measured by said dispersed weight measuring element;
   a control element controlling the supply of the objects from said transport element to said dispersion element on the basis of a target dispersed weight which is a target of total weight of the objects present on said dispersion element; and
   a change element changing said target dispersed weight on the basis of the delivery weight detected by the detection element.

8. The combinational weighing device according to claim 7, wherein
   said change element changes said target dispersed weight so that the delivery of the objects reaches a prescribed weight on the basis of the delivery weight of the objects detected by said detection element.

9. The combinational weighing device according to claim 7, wherein
   said change element changes said target dispersed weight by a quantity depending on a measuring state of the objects in said combinational weighing device.

10. The combinational weighing device according to claim 7, further comprising
    a determination element determining suitability of change of said target dispersed weight by said change element, wherein
    said determination element determines said suitability in response to a measuring state of the objects in said combinational weighing device.

11. The combinational weighing device according to claim 10, wherein
    said determination element makes said change element change said target dispersed weight in response to whether said measuring state of the objects is overscale or lightweight.

12. The combinational weighing deice according to claim 7, further comprising
   a delivery control element controlling the delivery of the objects discharged by said dispersion element.

13. The combinational weighing device according to claim 12, wherein
   said delivery control element comprises a strength control element controlling driving strength for said dispersion element.

14. The combinational weighing device according to claim 12, wherein
   said delivery control element comprises a time control element controlling a driving time for said dispersion element.

15. The combinational weighing device according to claim 7, further comprising
   an element disenabling said combinational weighing device when the total weight of the objects measured by said dispersed weight measuring element is not more than a predetermined lower limit.

* * * * *